(12) United States Patent
Yan et al.

(10) Patent No.: US 12,232,125 B2
(45) Date of Patent: Feb. 18, 2025

(54) COMMUNICATION METHOD AND COMMUNICATIONS APPARATUS

(71) Applicant: Huawei Technologies Co., Ltd., Shenzhen (CN)

(72) Inventors: Le Yan, Shenzhen (CN); Qinghai Zeng, Shanghai (CN); Tingting Geng, Shanghai (CN); Hongping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 17/371,352

(22) Filed: Jul. 9, 2021

(65) Prior Publication Data

US 2021/0377920 A1    Dec. 2, 2021

Related U.S. Application Data

(63) Continuation of application No. PCT/CN2020/071007, filed on Jan. 8, 2020.

(30) Foreign Application Priority Data

Jan. 11, 2019 (CN) .......................... 201910028856.2

(51) Int. Cl.
*H04L 1/1812* (2023.01)
*H04W 72/23* (2023.01)
*H04W 76/15* (2018.01)

(52) U.S. Cl.
CPC ........... *H04W 72/23* (2023.01); *H04W 76/15* (2018.02)

(58) Field of Classification Search
None
See application file for complete search history.

(56) References Cited

U.S. PATENT DOCUMENTS 9,642,125 B2    5/2017 Kim et al.
9,674,855 B2    6/2017 Chen et al.
(Continued)

FOREIGN PATENT DOCUMENTS

CN    103974430 A    8/2014
CN    104205711 A    12/2014
(Continued)

OTHER PUBLICATIONS

"Remaining Details on Multi-TRP Transmission," Agenda Item: 6.2.1.6, Source: Nokia, Nokia Shanghai Bell, Document for: Discussion and Decision, 3GPP TSG RAN WG1 NR Ad Hoc #3, R1-1716494, XP051339947, Nagoya, Japan, Sep. 18-21, 2017, 6 pages.

(Continued)

*Primary Examiner* — Ajit Patel
(74) *Attorney, Agent, or Firm* — SLATER MATSIL, LLP

(57) ABSTRACT

A communication method and apparatus, the method including receiving configuration information of a serving cell, where the configuration information includes a set of physical downlink control channel (PDCCH) configurations, and the set of PDCCH configurations includes N control resource set-related parameters, where each of the N control resource set-related parameters corresponds to each of N transmission reception points (TRPs), and N is an integer greater than or equal to 2, and communicating with the serving cell based on the configuration information.

20 Claims, 10 Drawing Sheets

(56) References Cited

U.S. PATENT DOCUMENTS

| | | | |
|---|---|---|---|
| 11,330,615 | B2 | 5/2022 | Zhang et al. |
| 2018/0124774 | A1 | 5/2018 | Takahashi et al. |
| 2018/0198650 | A1 | 7/2018 | Nogami et al. |
| 2019/0319686 | A1* | 10/2019 | Chen, IV ............. H04B 7/0639 |
| 2020/0037305 | A1* | 1/2020 | Yang ..................... H04L 5/0035 |
| 2020/0112947 | A1 | 4/2020 | Chen et al. |
| 2020/0213070 | A1* | 7/2020 | Guo ......................... H04L 5/10 |
| 2021/0160882 | A1* | 5/2021 | Jiang ..................... H04L 5/0094 |

FOREIGN PATENT DOCUMENTS

| | | |
|---|---|---|
| CN | 108713341 A | 10/2018 |
| WO | 2012173445 A2 | 12/2012 |
| WO | 2018195861 A1 | 11/2018 |
| WO | 2018204282 A1 | 11/2018 |

OTHER PUBLICATIONS

"Solution and TP for Multi-TRP PDCCH Transmission," Agenda Item: 7.1.3.1.5, Source: Huawei, HiSilicon, Document for: Discussion and Decision, 3GPP TSG RAN WG1 Meeting #92, R1-1802688, XP051398121, Feb. 26-Mar. 2, 2018, 4 pages.

"Discussion of Multi-Panel/Multi-TRP Transmission," Agenda Item: 7.2.8.2, Source: Lenovo, Motorola Mobility, Document for: Discussion, 3GPP TSG RAN WG1 Meeting #95, R1-1812784, XP051554742, Nov. 12-16, 2018, 5 pages.

"Discussion on Multi-TRP Transmission," Agenda Item: 7.2.8.2, Source: CHTTL, Document for: Discussion and Decision, 3GPP TSG RAN WG1 Meeting #95, R1-1813278, Nov. 12-16, 2018, 5 pages.

"3rd Generation Partnership Project; Technical Specification Group Radio Access Network; NR; Radio Resource Control (RRC) protocol specification (Release 15)," 3GPP TS 38.331 V15.3.0 , Sep. 2018, 445 pages.

"Considerations on DL Multi-Panel and Multi-TRP Transmission," Source: CATT, Agenda Item: 6.1.2.1.6, Document for: Discussion and decision, 3GPP TSG RAN WG1 #90, R1-1712368, Prague, Czechia, Aug. 21-25, 2017, 4 pages.

"Multi-TRP Transmission in NR," Source: Ericsson, Agenda Item: 7.2.8.2, Document for: Discussion and Decision, 3GPP TSG RAN WG1 Meeting #94bis, R1-1811182, Chengdu, China, Oct. 8-12, 2018, 12 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2020/071007, filed on Jan. 8, 2020, which claims priority to Chinese Patent Application No. 201910028856.2, filed on Jan. 11, 2019. The disclosures of the aforementioned applications are hereby incorporated by reference in their entireties.

TECHNICAL FIELD

This application relates to the communications field, and more specifically, to a communication method and a communications apparatus.

BACKGROUND

To increase a data transmission rate of a terminal device, the radio access network working group #1 (RAN WG11) of the 3rd generation partnership project (3GPP) studies a mechanism supporting multi-transmission-reception-point transmission (Multi-TRP transmission) in a cell.

A plurality of transmission reception points (TRP) may communicate with each other through ideal backhaul or non-ideal backhaul.

In the mechanism of multi-transmission-reception-point transmission in a cell, how the terminal device communicates with the cell becomes a problem that urgently needs to be resolved currently.

SUMMARY

This application provides a communication method and a communications apparatus, so that a terminal device can communicate with a plurality of transmission reception points in a cell, and communication efficiency is ensured as far as possible.

According to a first aspect, a communication method is provided. The method may be performed by a terminal device, or may be performed by a chip or a circuit disposed in a terminal device. This is not limited in this application.

Specifically, the method includes receiving configuration information of a serving cell, where the configuration information includes N sets of downlink control channel-related configuration parameters corresponding to the serving cell, each set of configuration parameters includes a same type of parameter, and N is an integer greater than or equal to 2, and communicating with the serving cell based on the N sets of downlink control channel-related configuration parameters.

The serving cell may be a cell configured by a network to perform uplink and downlink transmission with the terminal device.

That the terminal device communicates with the serving cell may also be understood as that the terminal device communicates with a transmission reception point in the serving cell by using a transmission resource (for example, a frequency domain resource, in other words, a spectrum resource) allocated by the serving cell (or a network device to which the serving cell belongs). The transmission reception point may be referred to as an access device or a transmission point. It should be understood that naming of the transmission reception point should not constitute any limitation on this application. This application does not exclude a possibility of defining another name in a future protocol to represent a same or similar meaning. In this embodiment of this application, the transmission reception point is represented by a transmission reception point (TRP).

The N sets of downlink control channel-related configuration parameters may be understood as that the serving cell includes N transmission reception points, the terminal device may communicate with the N transmission reception points in the serving cell, and the N sets of downlink control channel-related configuration parameters correspond to the N transmission reception points in the serving cell, in other words, each transmission reception point corresponds to one set of downlink control channel-related configuration parameters. Each transmission reception point may perform data transmission with the terminal device based on a downlink control channel-related configuration parameter corresponding to the transmission reception point.

Alternatively, the N sets of downlink control channel-related configuration parameters may be understood as that the serving cell includes N transmission reception points, the terminal device may separately use a corresponding link for communication when communicating with each of the N transmission reception points, the terminal device may communicate with N links in the serving cell, and the N sets of downlink control channel-related configuration parameters correspond to the N links through which the serving cell communicates with the terminal device, in other words, each link corresponds to one set of downlink control channel-related configuration parameters. Each link may perform data transmission with the terminal device based on a downlink control channel-related configuration parameter corresponding to the link.

According to the foregoing technical solution, the configuration information of the serving cell includes the N sets of downlink control channel-related configuration parameters, and each set of configuration parameters includes a same type of parameter, in other words, each set of configuration parameters corresponds to one transmission reception point in the serving cell. Alternatively, this may be understood as that the network device configures one set of downlink control channel-related configuration parameters for each transmission reception point in the serving cell. In this case, each transmission reception point in the serving cell may perform data transmission with the terminal device based on a configuration parameter corresponding to the transmission reception point (or a configuration parameter configured for the transmission reception point, or a configuration parameter associated with the transmission reception point). In this way, interference that may arise when a plurality of transmission reception points in the serving cell communicate with the terminal device by using one set of configuration parameters can be avoided. In addition, the terminal device can communicate with a corresponding transmission reception point based on an actual communication status and a corresponding configuration parameter, thereby improving communication efficiency.

With reference to the first aspect, in some implementations of the first aspect, the method further includes receiving first downlink control information (DCI), where a configuration parameter corresponding to the first DCI belongs to one of the N sets of downlink control channel-related configuration parameters, and determining, based on the first DCI, a link corresponding to the first DCI.

The receiving first downlink control information (DCI) from the serving cell may be understood as receiving DCI sent by a transmission reception point in the serving cell (in other words, by the transmission reception point through a link between the transmission reception point and the terminal device).

According to the foregoing technical solution, when sending DCI to the terminal device, a transmission reception point in the serving cell may send the DCI based on a set of configuration parameters corresponding to the transmission reception point. Correspondingly, after receiving the DCI, the terminal device may also determine, based on the set of configuration parameters, the transmission reception point or a link that sends the DCI, in other words, the terminal device can identify the transmission reception point or the link from which the received DCI comes. Therefore, the terminal device can also send uplink information to the corresponding transmission reception point or link.

With reference to the first aspect, in some implementations of the first aspect, the configuration parameters include at least one of the following: a physical downlink control channel (PDCCH) configuration, cell identification information, a cell radio network temporary identifier (C-RNTI), a demodulation reference signal (DMRS), beam set information, or beam information.

With reference to the first aspect, in some implementations of the first aspect, the N sets of downlink control channel-related configuration parameters correspond to N links of the serving cell, and the N links include a first link and a second link, and the method further includes performing a beam failure detection and beam failure recovery process based on the first link, or performing a random access process based on the first link, or performing radio link management (RLM) based on the first link, or performing RLM based on each of the first link and the second link, and when a radio link failure (RLF) occurs on the first link, triggering radio resource control (RRC) reestablishment, where the first link is a primary link.

The N links of the serving cell may also be understood as N transmission reception points in the serving cell.

That the N sets of downlink control channel-related configuration parameters correspond to N links of the serving cell may also be understood as that the N sets of downlink control channel-related configuration parameters correspond to the N transmission reception points in the serving cell, that is, each transmission reception point in the serving cell may perform data transmission with the terminal device based on a set of configuration parameters corresponding to the transmission reception point.

According to the foregoing technical solution, the terminal device may perform some operations only based on one link (for example, denoted as the first link) or only for one transmission reception point, to avoid performing these processes with all or a plurality of TRPs in one serving cell for a plurality of times, thereby simplifying implementation of the terminal device and reducing protocol complexity.

With reference to the first aspect, in some implementations of the first aspect, the method further includes receiving N sets of uplink control channel-related configuration parameters corresponding to the serving cell, where the N sets of uplink control channel-related configuration parameters are in a one-to-one association with the N sets of downlink control channel-related configuration parameters.

According to the foregoing technical solution, the N sets of downlink control channel-related configuration parameters are in a one-to-one association with the N sets of uplink control channel-related configuration parameters. To be specific, when a transmission reception point in the serving cell sends downlink information based on a set of downlink control channel-related configuration parameters corresponding to the transmission reception point, the terminal device may also send uplink information or an uplink feedback to the transmission reception point based on a set of uplink control channel-related configuration parameters corresponding to the set of configuration parameters, so that the terminal device and the transmission reception point can normally and efficiently communicate with each other. In addition, the transmission reception point can receive uplink information corresponding to the transmission reception point in a timely manner, thereby improving robustness and increasing a throughput of the terminal device.

With reference to the first aspect, in some implementations of the first aspect, the method further includes determining a type of a protocol architecture used for communication with the serving cell, where the type of the protocol architecture includes at least one of the following: a multi-connectivity-like architecture, a carrier-aggregation-like architecture, or a single-cell-like architecture.

The single-cell-like architecture may be a first single-cell-like architecture, or may be a second single-cell-like architecture, and is described in detail in the following embodiments. It should be understood that naming of the first single-cell-like architecture and the second single-cell-like architecture should not constitute any limitation on this application. This application does not exclude a possibility of defining another name in a future protocol to represent a same or similar meaning.

With reference to the first aspect, in some implementations of the first aspect, the method further includes obtaining indication information, where the indication information is used to indicate the type of the protocol architecture used for communication between the terminal device and the serving cell, and the determining a type of a protocol architecture used for communication with the serving cell includes determining, based on the indication information, the type of the protocol architecture used for communication with the serving cell.

With reference to the first aspect, in some implementations of the first aspect, the N sets of downlink control channel-related configuration parameters correspond to the N links of the serving cell, and when the type of the protocol architecture is the multi-connectivity-like architecture, corresponding to a configured radio bearer (RB) that is allowed to use the serving cell, one packet data convergence protocol (PDCP) entity is generated, N radio link control (RLC) entities are generated, N media access control (MAC) entities are generated, and N hybrid automatic repeat request (HARQ) entities are generated, where the PDCP entity is shared by the N links, the N RLC entities correspond to the N links, the N MAC entities correspond to the N links, and the N HARQ entities correspond to the N links, or when the type of the protocol architecture is the carrier-aggregation-like architecture, corresponding to a configured RB that is allowed to use the serving cell, one PDCP entity, one RLC entity, and one MAC entity are generated, and N HARQ entities are generated, where the PDCP entity is shared by the N links, the RLC entity is shared by the N links, the MAC entity is shared by the N links, and the N HARQ entities correspond to the N links, or when the type of the protocol architecture is the single-cell-like architecture, corresponding to a configured RB that is allowed to use the serving cell, one PDCP entity, one RLC entity, one MAC entity, and one HARQ entity are generated, where the PDCP entity is shared by the N links, the RLC entity is shared by the N links, the MAC entity is shared by the N links, and the HARQ entity is shared by the N links.

According to a second aspect, a communication method is provided. The method may be performed by a network device, or may be performed by a chip or a circuit disposed in a network device. This is not limited in this application.

The network device may be understood as an access network device to which a transmission reception point belongs, or understood as an access network device that controls the transmission reception point (for example, the access network device may be a base station, such as an evolved NodeB (eNB or eNodeB), a next generation nodeB (gNB), a central unit (CU), or a distributed unit (DU), and this is not limited). A serving cell, to which the transmission reception point belongs, belongs to the access network device.

Specifically, the method includes generating configuration information of a serving cell, where the configuration information includes N sets of downlink control channel-related configuration parameters corresponding to the serving cell, each set of configuration parameters includes a same type of parameter, and N is an integer greater than or equal to 2, and sending the configuration information of the serving cell.

The serving cell may be a cell configured by the network device to perform uplink and downlink transmission with a terminal device.

According to the foregoing technical solution, the network device may configure the N sets of downlink control channel-related configuration parameters for the serving cell, and each set of configuration parameters includes a same type of parameter. Alternatively, this may be understood as that the network device configures one set of downlink control channel-related configuration parameters for each transmission reception point in the serving cell. In this case, each transmission reception point in the serving cell may perform data transmission with the terminal device based on a configuration parameter configured for the transmission reception point. In this way, interference that may arise when a plurality of transmission reception points in the serving cell communicate with the terminal device by using one set of configuration parameters can be avoided. In addition, the terminal device can communicate with a corresponding transmission reception point based on an actual communication status and a corresponding configuration parameter, thereby improving communication efficiency.

With reference to the second aspect, in some implementations of the second aspect, the method further includes sending first downlink control information (DCI), where a configuration parameter corresponding to the first DCI belongs to one of the N sets of downlink control channel-related configuration parameters.

With reference to the second aspect, in some implementations of the second aspect, the configuration parameters include at least one of the following: a physical downlink control channel (PDCCH) configuration, cell identification information, a cell radio network temporary identifier (C-RNTI), a demodulation reference signal (DMRS), beam set information, or beam information.

With reference to the second aspect, in some implementations of the second aspect, the method further includes sending N sets of uplink control channel-related configuration parameters corresponding to the serving cell, where the N sets of uplink control channel-related configuration parameters are in a one-to-one association with the N sets of downlink control channel-related configuration parameters.

With reference to the second aspect, in some implementations of the second aspect, the method further includes sending indication information, where the indication information is used to indicate a type of a protocol architecture used for communication between the terminal device and the serving cell, where the type of the protocol architecture includes at least one of the following: a multi-connectivity-like architecture, a carrier-aggregation-like architecture, or a single-cell-like architecture.

According to a third aspect, a communication method is provided. The method may be performed by a terminal device, or may be performed by a chip or a circuit disposed in a terminal device. This is not limited in this application.

Specifically, the method includes communicating with a serving cell based on N sets of uplink control channel-related configuration parameters corresponding to the serving cell, where the N sets of uplink control channel-related configuration parameters are in a one-to-one association with N sets of downlink control channel-related configuration parameters, the N sets of downlink control channel-related configuration parameters correspond to N links of the serving cell, the N links of the serving cell share one PDCP entity, one RLC entity, one MAC entity, and one HARQ entity, and N is an integer greater than or equal to 2.

According to the foregoing technical solution, the terminal device may send uplink information or an uplink feedback to the transmission reception point based on the N sets of uplink control channel-related configuration parameters, so that the terminal device and the transmission reception point can normally and efficiently communicate with each other. In addition, the transmission reception point can receive uplink information corresponding to the transmission reception point in a timely manner, thereby improving robustness and increasing a throughput of the terminal device. According to the foregoing solution, the terminal device may not need to generate an RLC entity, a MAC entity, and a HARQ entity for each configured RB that is allowed to use the serving cell, thereby avoiding occupying more resources such as storage and computing resources. In addition, each transmission reception point may directly receive a HARQ feedback that is sent by the terminal device and that corresponds to the transmission reception point, thereby avoiding a delay in HARQ retransmission and a decrease in a throughput. In addition, according to the foregoing solution, for an RB that is configured by the network device and that is allowed to use the serving cell, the terminal device may not need to generate a HARQ entity for each transmission reception point, thereby avoiding occupying more resources such as storage and computing resources.

With reference to the third aspect, in some implementations of the third aspect, the configuration parameters include at least one of the following: a physical downlink control channel (PDCCH) configuration, cell identification information, a cell radio network temporary identifier (C-RNTI), a demodulation reference signal (DMRS), beam set information, or beam information.

According to a fourth aspect, a communication method is provided. The method may be performed by a network device, or may be performed by a chip or a circuit disposed in a network device. This is not limited in this application.

The network device may be understood as an access network device to which a transmission reception point belongs, or understood as an access network device that controls the transmission reception point (for example, the access network device may be a base station, such as an eNB, a gNB, a CU, or a DU, and this is not limited). A serving cell, to which the transmission reception point belongs, belongs to the access network device.

Specifically, the method includes communicating with a terminal device based on N sets of downlink control channel-related configuration parameters corresponding to a serving cell, where the N sets of downlink control channel-related configuration parameters correspond to N links of the serving cell, the N links of the serving cell share one PDCP entity, one RLC entity, one MAC entity, and one HARQ entity, the N sets of downlink control channel-related configuration parameters are in a one-to-one association with N sets of uplink control channel-related configuration parameters, and N is an integer greater than or equal to 2.

With reference to the fourth aspect, in some implementations of the fourth aspect, the configuration parameters include at least one of the following: a physical downlink control channel (PDCCH) configuration, cell identification information, a cell radio network temporary identifier (C-RNTI), a demodulation reference signal (DMRS), beam set information, or beam information.

According to a fifth aspect, a communications apparatus is provided, including a communications unit and a processing unit. The communications unit is configured to receive configuration information of a serving cell, where the configuration information includes N sets of downlink control channel-related configuration parameters corresponding to the serving cell, each set of configuration parameters includes a same type of parameter, and N is an integer greater than or equal to 2. The processing unit is configured to communicate with the serving cell based on the N sets of downlink control channel-related configuration parameters.

The apparatus may be disposed in a terminal device, or may be a terminal device.

With reference to the fifth aspect, in some implementations of the fifth aspect, the communications unit is further configured to receive first downlink control information (DCI), where a configuration parameter corresponding to the first DCI belongs to one of the N sets of downlink control channel-related configuration parameters, and the processing unit is configured to determine, based on the first DCI, a link corresponding to the first DCI.

With reference to the fifth aspect, in some implementations of the fifth aspect, the configuration parameters include at least one of the following: a physical downlink control channel (PDCCH) configuration, cell identification information, a cell radio network temporary identifier (C-RNTI), a demodulation reference signal (DMRS), beam set information, or beam information.

With reference to the fifth aspect, in some implementations of the fifth aspect, the N sets of downlink control channel-related configuration parameters correspond to N links of the serving cell, and the N links include a first link and a second link, and the processing unit is further configured to perform a beam failure detection and beam failure recovery process based on the first link, or perform a random access process based on the first link, or perform radio link management (RLM) based on the first link, or perform RLM based on each of the first link and the second link, and when a radio link failure (RLF) occurs on the first link, trigger radio resource control (RRC) reestablishment, where the first link is a primary link.

With reference to the fifth aspect, in some implementations of the fifth aspect, the communications unit is further configured to receive N sets of uplink control channel-related configuration parameters corresponding to the serving cell, where the N sets of uplink control channel-related configuration parameters are in a one-to-one association with the N sets of downlink control channel-related configuration parameters.

With reference to the fifth aspect, in some implementations of the fifth aspect, the processing unit is further configured to determine a type of a protocol architecture used for communication with the serving cell, where the type of the protocol architecture includes at least one of the following: a multi-connectivity-like architecture, a carrier-aggregation-like architecture, or a single-cell-like architecture.

With reference to the fifth aspect, in some implementations of the fifth aspect, the communications unit is further configured to obtain indication information, where the indication information is used to indicate the type of the protocol architecture used for communication between the terminal device and the serving cell, and the processing unit is specifically configured to determine, based on the indication information, the type of the protocol architecture used for communication with the serving cell.

With reference to the fifth aspect, in some implementations of the fifth aspect, the N sets of downlink control channel-related configuration parameters correspond to the N links of the serving cell, and the processing unit is further configured to when the type of the protocol architecture is the multi-connectivity-like architecture, corresponding to a configured radio bearer (RB) that is allowed to use the serving cell, generate one packet data convergence protocol (PDCP) entity, generate N radio link control (RLC) entities, generate N media access control (MAC) entities, and generate N hybrid automatic repeat request (HARQ) entities, where the PDCP entity is shared by the N links, the N RLC entities correspond to the N links, the N MAC entities correspond to the N links, and the N HARQ entities correspond to the N links, or when the type of the protocol architecture is the carrier-aggregation-like architecture, corresponding to a configured RB that is allowed to use the serving cell, generate one PDCP entity, one RLC entity, and one MAC entity, and generate N HARQ entities, where the PDCP entity is shared by the N links, the RLC entity is shared by the N links, the MAC entity is shared by the N links, and the N HARQ entities correspond to the N links, or when the type of the protocol architecture is the single-cell-like architecture, corresponding to a configured RB that is allowed to use the serving cell, generate one PDCP entity, one RLC entity, one MAC entity, and one HARQ entity, where the PDCP entity is shared by the N links, the RLC entity is shared by the N links, the MAC entity is shared by the N links, and the HARQ entity is shared by the N links.

The units in the apparatus are separately configured to perform the steps of the communication method according to the first aspect and the implementations of the first aspect.

In a design, the apparatus is a communications chip. The communications chip may include an input circuit or interface configured to send information or data, and an output circuit or interface configured to receive information or data.

In another design, the apparatus is a communications device. The communications device may include a transmitter configured to send information or data, and a receiver configured to receive information or data.

According to a sixth aspect, a communications apparatus is provided, including a communications unit and a processing unit. The processing unit is configured to generate configuration information of a serving cell, where the configuration information includes N sets of downlink control channel-related configuration parameters corresponding to the serving cell, each set of configuration parameters includes a same type of parameter, and N is an integer greater than or equal to 2. The communications unit is configured to send the configuration information of the serving cell.

The apparatus may be disposed in a network device, or may be a network device, a serving cell in a base station, or a transmission reception point (for example, a TRP).

With reference to the sixth aspect, in some implementations of the sixth aspect, the communications unit is further configured to send first downlink control information (DCI), where a configuration parameter corresponding to the first DCI belongs to one of the N sets of downlink control channel-related configuration parameters.

With reference to the sixth aspect, in some implementations of the sixth aspect, the configuration parameters include at least one of the following: a physical downlink control channel (PDCCH) configuration, cell identification information, a cell radio network temporary identifier (C-RNTI), a demodulation reference signal (DMRS), beam set information, or beam information.

With reference to the sixth aspect, in some implementations of the sixth aspect, the communications unit is further configured to send N sets of uplink control channel-related configuration parameters corresponding to the serving cell, where the N sets of uplink control channel-related configuration parameters are in a one-to-one association with the N sets of downlink control channel-related configuration parameters.

With reference to the sixth aspect, in some implementations of the sixth aspect, the communications unit is further configured to send indication information, where the indication information is used to indicate a type of a protocol architecture used for communication between a terminal device and the serving cell, where the type of the protocol architecture includes at least one of the following: a multi-connectivity-like architecture, a carrier-aggregation-like architecture, or a single-cell-like architecture.

The units in the apparatus are separately configured to perform the steps of the communication method according to the second aspect and the implementations of the second aspect.

In a design, the communications apparatus is a communications chip. The communications chip may include an input circuit or interface configured to send information or data, and an output circuit or interface configured to receive information or data.

In another design, the communications apparatus is a communications device. The communications device may include a transmitter configured to send information or data, and a receiver configured to receive information or data.

According to a seventh aspect, a communications apparatus is provided, including a communications unit. The communications unit is configured to communicate with a serving cell based on N sets of uplink control channel-related configuration parameters corresponding to the serving cell, where the N sets of uplink control channel-related configuration parameters are in a one-to-one association with N sets of downlink control channel-related configuration parameters, the N sets of downlink control channel-related configuration parameters correspond to N links of the serving cell, the N links of the serving cell share one PDCP entity, one RLC entity, one MAC entity, and one HARQ entity, and N is an integer greater than or equal to 2.

The apparatus may be disposed in a terminal device, or may be a terminal device.

With reference to the seventh aspect, in some implementations of the seventh aspect, the configuration parameters include at least one of the following: a physical downlink control channel (PDCCH) configuration, cell identification information, a cell radio network temporary identifier (C-RNTI), a demodulation reference signal (DMRS), beam set information, or beam information.

According to an eighth aspect, a communications apparatus is provided, including a communications unit and a processing unit. The communications unit is configured to communicate with a terminal device based on N sets of downlink control channel-related configuration parameters corresponding to a serving cell, where the N sets of downlink control channel-related configuration parameters correspond to N links of the serving cell, the N links of the serving cell share one PDCP entity, one RLC entity, one MAC entity, and one HARQ entity, the N sets of downlink control channel-related configuration parameters are in a one-to-one association with N sets of uplink control channel-related configuration parameters, and N is an integer greater than or equal to 2.

The apparatus may be disposed in a network device, or may be a network device, a serving cell in a base station, or a transmission reception point (for example, a TRP).

With reference to the eighth aspect, in some implementations of the eighth aspect, the configuration parameters include at least one of the following: a physical downlink control channel (PDCCH) configuration, cell identification information, a cell radio network temporary identifier (C-RNTI), a demodulation reference signal (DMRS), beam set information, or beam information.

According to a ninth aspect, a communications device is provided, including a processor and a memory. The memory is configured to store a computer program. The processor is configured to invoke the computer program from the memory and run the computer program, so that the communications device performs the communication method according to the first aspect or the third aspect and the possible implementations of the first aspect or the third aspect.

Optionally, there are one or more processors, and there are one or more memories.

Optionally, the memory may be integrated with the processor, or the memory and the processor are disposed separately.

Optionally, the communications device further includes a transmitter (a transmitter device) and a receiver (a receiver device).

According to a tenth aspect, a communications device is provided, including a processor and a memory. The memory is configured to store a computer program. The processor is configured to invoke the computer program from the memory and run the computer program, so that the communications device performs the communication method according to the second aspect or the fourth aspect and the implementations of the second aspect or the fourth aspect.

Optionally, there are one or more processors, and there are one or more memories.

Optionally, the memory may be integrated with the processor, or the memory and the processor are disposed separately.

Optionally, the communications device further includes a transmitter (a transmitter device) and a receiver (a receiver device).

According to an eleventh aspect, a communications system is provided, including the communications device according to the ninth aspect and/or the communications device according to the tenth aspect.

In a possible design, the communications system may further include another device that interacts with the communications device in the solutions provided in the embodiments of this application.

According to a twelfth aspect, a computer program product is provided. The computer program product includes a computer program (which may also be referred to as code or an instruction). When the computer program is run, a computer is enabled to perform the method according to any one of the possible implementations of the first aspect to the fourth aspect.

According to a thirteenth aspect, a computer-readable medium is provided. The computer-readable medium stores a computer program (which may also be referred to as code or an instruction). When the computer program runs on a computer, the computer is enabled to perform the method according to any one of the possible implementations of the first aspect to the fourth aspect.

According to a fourteenth aspect, a chip system is provided, including a memory and a processor. The memory is configured to store a computer program. The processor is configured to invoke the computer program from the memory and run the computer program, so that a communications device on which the chip system is installed performs the method according to any one of the possible implementations of the first aspect to the fourth aspect.

The chip system may include an input circuit or interface configured to send information or data, and an output circuit or interface configured to receive information or data.

According to a fifteenth aspect, a communications system is provided, including a plurality of transmission reception points TRPs.

According to a sixteenth aspect, a communications system is provided, including the foregoing terminal device and base station.

According to the embodiments of this application, the network device may configure the N sets of downlink control channel-related configuration parameters for the serving cell. Alternatively, this may be understood as that the network device configures one set of downlink control channel-related configuration parameters for each transmission reception point in the serving cell. In this case, each transmission reception point in the serving cell may perform data transmission with the terminal device based on a configuration parameter configured for the transmission reception point. In this way, interference that may arise when a plurality of transmission reception points in the serving cell communicate with the terminal device by using one set of configuration parameters can be avoided. In addition, the terminal device can communicate with a corresponding transmission reception point based on an actual communication status and a corresponding configuration parameter, thereby improving communication efficiency.

DETAILED DESCRIPTION OF ILLUSTRATIVE EMBODIMENTS

Figure 1:
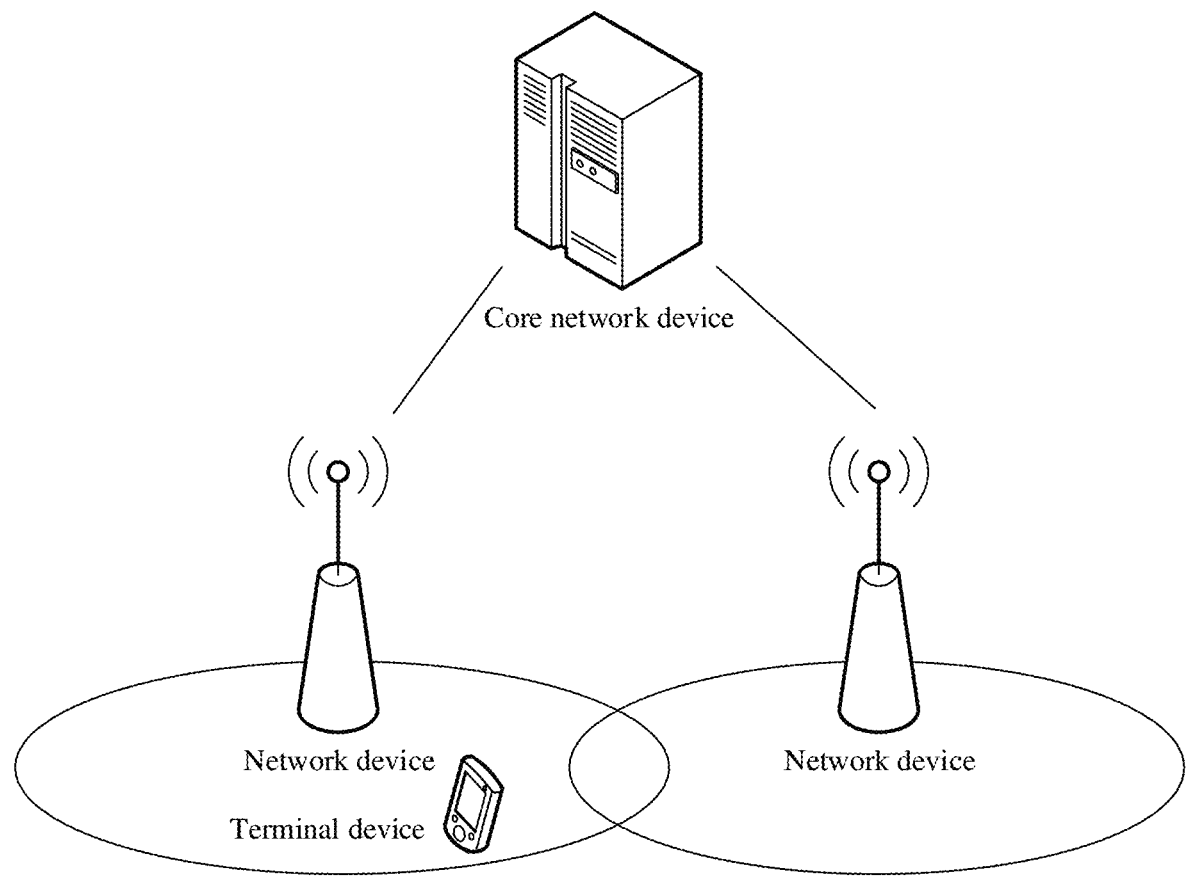
FIG. 1 is a schematic diagram of a network architecture.

The following describes the technical solutions of this application with reference to the accompanying drawings.

The technical solutions in the embodiments of this application may be used in various communications systems, for example, a long term evolution (LTE) system, an LTE frequency division duplex (FDD) system, LTE time division duplex (TDD) system, a universal mobile telecommunications system (UMTS), a 5th generation (5G) system, new radio (NR), or another evolved communications system.

The terminal device in the embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communications device, a user agent, a user apparatus, or the like.

The terminal device may be a device that provides voice/data connectivity for a user, for example, a handheld device having a wireless connection function or a vehicle-mounted device. Currently, some examples of the terminal are a mobile phone, a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, or a terminal device in a future evolved public land mobile network (PLMN). This is not limited in the embodiments of this application.

By way of example and not limitation, in the embodiments of this application, the terminal device may alternatively be a wearable device. The wearable device may also be referred to as a wearable intelligent device. The wearable intelligent device is a collective name of wearable devices, such as glasses, a glove, a watch, clothing, and shoes, obtained by performing intelligent design and development on daily wear by using a wearable technology. The wearable device is a portable device that is directly worn on a body or integrated with clothing or an accessory of a user. The wearable device is not merely a hardware device, but further implements a powerful function through software support, data exchange, and cloud-based interaction. In a broad sense, wearable intelligent devices include a device that provides a complete function, has a large size, and can implement all or some functions without relying on a smartphone, for example, a smartwatch or smart glasses, and include a device that focuses only on a specific type of application function and needs to be used in combination with another device such as a smartphone, for example, various smart bands and smart jewelry used for vital sign monitoring.

In addition, in the embodiments of this application, the terminal device may alternatively be a terminal device in an internet of things (IoT) system. The IoT is an important component of future information technology development. A main technical feature of the IoT is to connect an object to a network by using a communications technology, to implement an intelligent network of human-computer interconnection and thing-to-thing interconnection.

In addition, a network device in the embodiments of this application may be a device configured to communicate with the terminal device. The network device may also be referred to as an access network device or a radio access network device. The network device may be a transmission reception point (TRP), or may be a base transceiver station (BTS) in global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a base station controller (BSC), a base transceiver station (BTS), a home NodeB (for example, a home evolved NodeB, or a home NodeB, HNB), or a baseband unit (BBU), or may be a radio controller in a cloud radio access network (CRAN) scenario. Alternatively, the network device may be a relay station, an access point, a vehicle-mounted device, a wearable device, a network device in a 5G network, a network device in a future evolved PLMN network, or the like, may be an access point (AP) in a WLAN, or may be a gNB in a new radio (NR) system. This is not limited in the embodiments of this application.

In a network structure, the network device may include a central unit (CU) node or a distributed unit (DU) node, or may be a RAN device including a CU node and a DU node, or may be a RAN device including a control plane CU node (CU-CP node), a user plane CU node (CU-UP node), and a DU node.

The network device provides a service for a cell. The terminal device communicates with the cell or a transmission reception point in the cell by using a transmission resource (for example, a frequency domain resource, in other words, a spectrum resource) allocated by the network device. The cell may be a cell corresponding to a transmission reception point. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have features of a small coverage area and a low transmit power, and are suitable for providing high-rate data transmission services.

FIG. 1 is a schematic diagram of a network architecture for dual connectivity (DC). As shown in FIG. 1, a terminal device may simultaneously have communication connections to two network devices and may send and receive data. This may be referred to as dual connectivity. One of the two network devices (for example, base stations) may be responsible for exchanging a radio resource control message with the terminal device, and responsible for interacting with a core network control plane entity. In this case, the network device may be referred to as a master node (MN). For example, the master node may be an master eNB (MeNB) or an mater gNB (MgNB), but is not limited thereto. In this case, the other network device may be referred to as a secondary node (SN). For example, the secondary node may be an secondary eNB (SeNB) or an secondary gNB (SgNB), but is not limited thereto. The master node is a control plane anchor. To be specific, the terminal device establishes an RRC connection to the master node, and the master node establishes a control plane connection to a core network. In DC, a plurality of serving cells in the master node form a master cell group (MCG), including one primary cell (PCell) and optionally, one or more secondary cells (SCell). A plurality of serving cells in the secondary node form a secondary cell group (SCG), including one primary secondary cell (PSCell, which may also be referred to as a special cell) and optionally, one or more SCells. The serving cell is a cell configured by a network for the terminal device to perform uplink and downlink transmission.

Similarly, alternatively, the terminal device may simultaneously have communication connections to a plurality of network devices and may send and receive data. This may be referred to as multi-link or multi-connectivity (MC). One of the plurality of network devices may be responsible for exchanging a radio resource control message with the terminal device, and responsible for interacting with a core network control plane entity. In this case, the network device may be referred to as an MN, and a remaining network device may be referred to as an SN.

Figure 2:
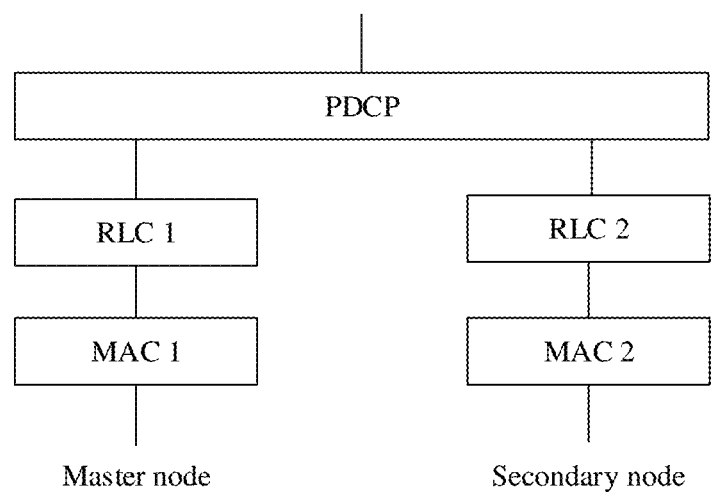
FIG. 2 is a schematic diagram of a protocol stack architecture for dual connectivity.

Communication between the network device and the terminal device complies with a specific user plane protocol stack architecture. For example, the user plane protocol stack architecture may include functions of protocol layers such as a radio resource control (RRC) layer, a packet data convergence protocol (PDCP) layer, a radio link control (RLC) layer, a media access control (MAC) layer, and a physical layer. FIG. 2 is a diagram of a protocol stack architecture for DC. In DC, corresponding to a radio bearer, the two network devices share one PDCP entity, in other words, the PDCP entity is used by both the network devices, and the two network devices each have a corresponding RLC entity and MAC entity.

It should be understood that FIG. 1 is a schematic diagram of the network architecture for DC. For ease of understanding this application, the following first describes an architecture for carrier aggregation.

Carrier aggregation (CA): To efficiently utilize fragmented spectrums, a system supports aggregation between different component carriers. A technology that aggregates two or more carriers to support a higher transmission bandwidth may be referred to as carrier aggregation.

In the carrier aggregation technology, a plurality of component carriers (CC), or referred to as a member carrier, a constituent carrier, a carrier, or the like) may be configured for a terminal device, and each CC may correspond to an independent cell. A CC may be equivalent to a cell. For example, a primary cell corresponds to a primary CC (or referred to as a primary carrier), and may be a cell for establishing an initial connection for a terminal, a cell for reestablishing an RRC connection, or a primary cell specified in a handover (handover) process. A secondary cell corresponds to a secondary CC (or referred to as a secondary carrier), and may be a cell that is added during RRC reconfiguration and that is used to provide additional radio resources.

For a terminal device in a connected state, if carrier aggregation is not configured, the terminal device has one serving cell, or if carrier aggregation is configured, the terminal device may have a plurality of serving cells, which may be referred to as a serving cell set. For example, the foregoing primary cell and secondary cell form a serving cell (serving cell) set of the terminal device. In other words, in a scenario in which carrier aggregation is configured, the serving cell set includes at least one primary cell and at least one secondary cell. In other words, the terminal device for which carrier aggregation is configured may perform data transmission with one PCell and a plurality of SCells.

Figure 3:
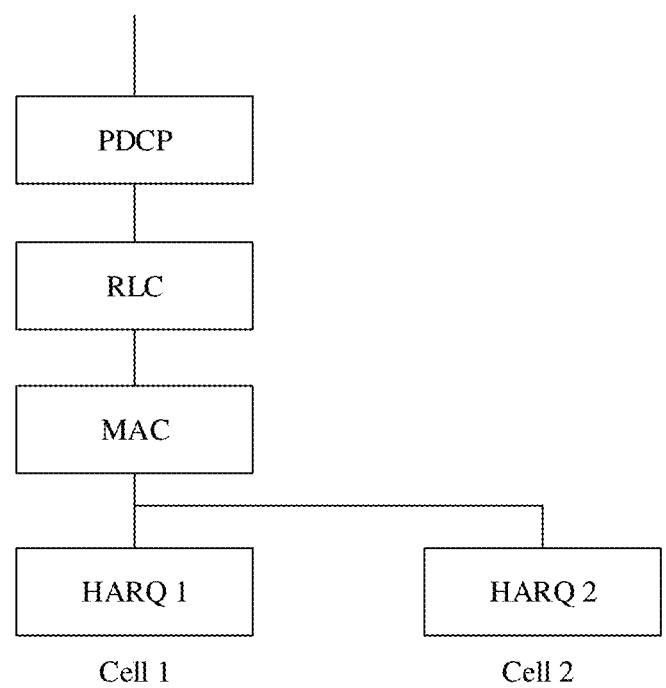
FIG. 3 is a schematic diagram of a protocol stack architecture for carrier aggregation.

FIG. 3 is a diagram of a protocol stack architecture for carrier aggregation. The protocol stack architecture shown in FIG. 3 is applicable to a scenario in which carrier aggregation is performed on two CCs. As shown in FIG. 3, in the scenario in which carrier aggregation (CA) is performed on two CCs, corresponding to a radio bearer, two serving cells share one PDCP entity, one RLC entity, and one MAC entity, in other words, one PDCP entity, one RLC entity, and one MAC entity are used by both the serving cells, and the two serving cells each have a corresponding separate hybrid automatic repeat request (HARQ) entity.

The foregoing describes the network architectures for DC and CA. The following describes a scenario, to which the embodiments of this application are applicable, of multi-transmission-reception-point (TRP) transmission in a cell.

Figure 4:
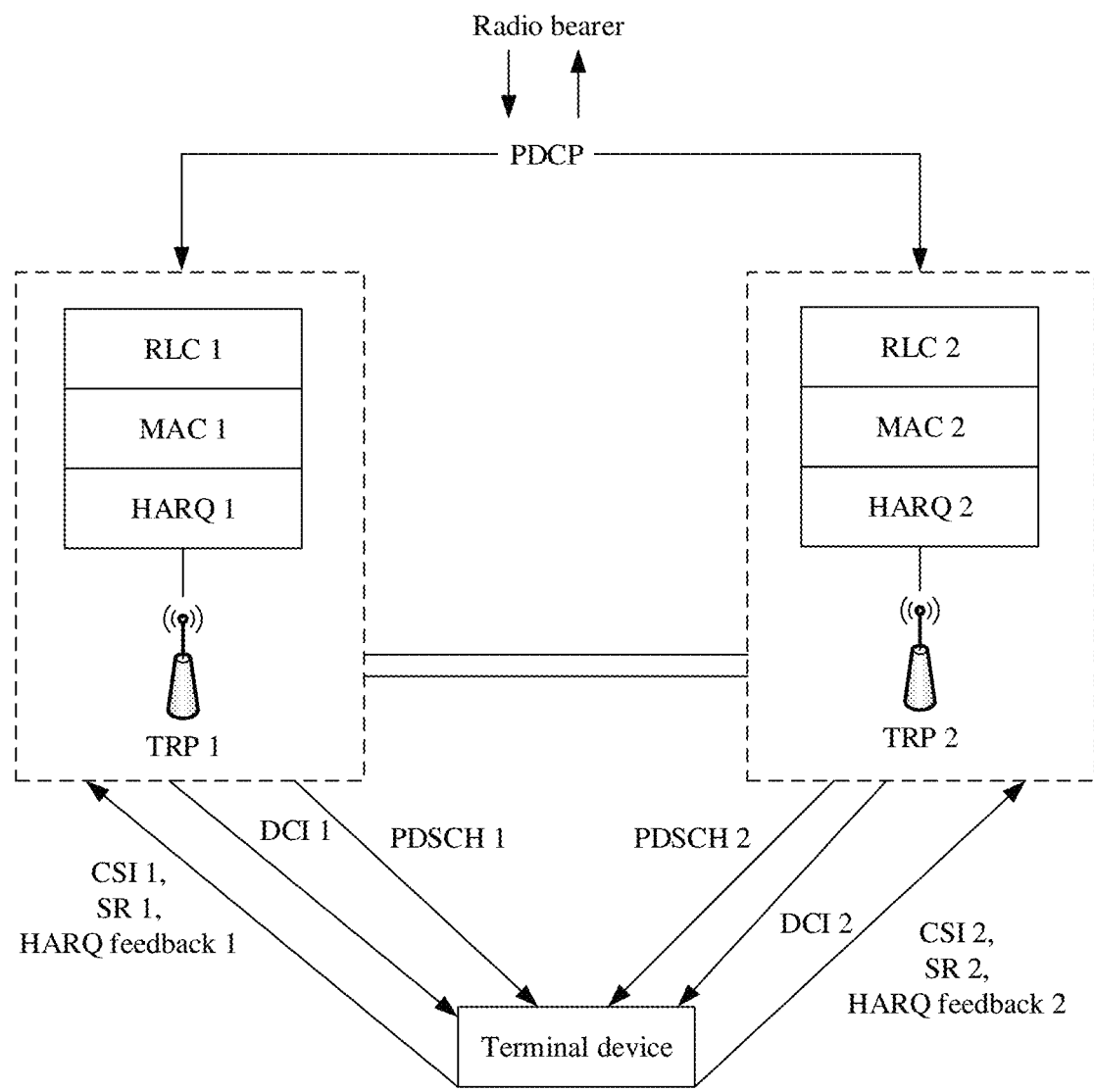
FIG. 4 to FIG. 6 are schematic diagrams of three protocol stack architectures.
Figure 5:
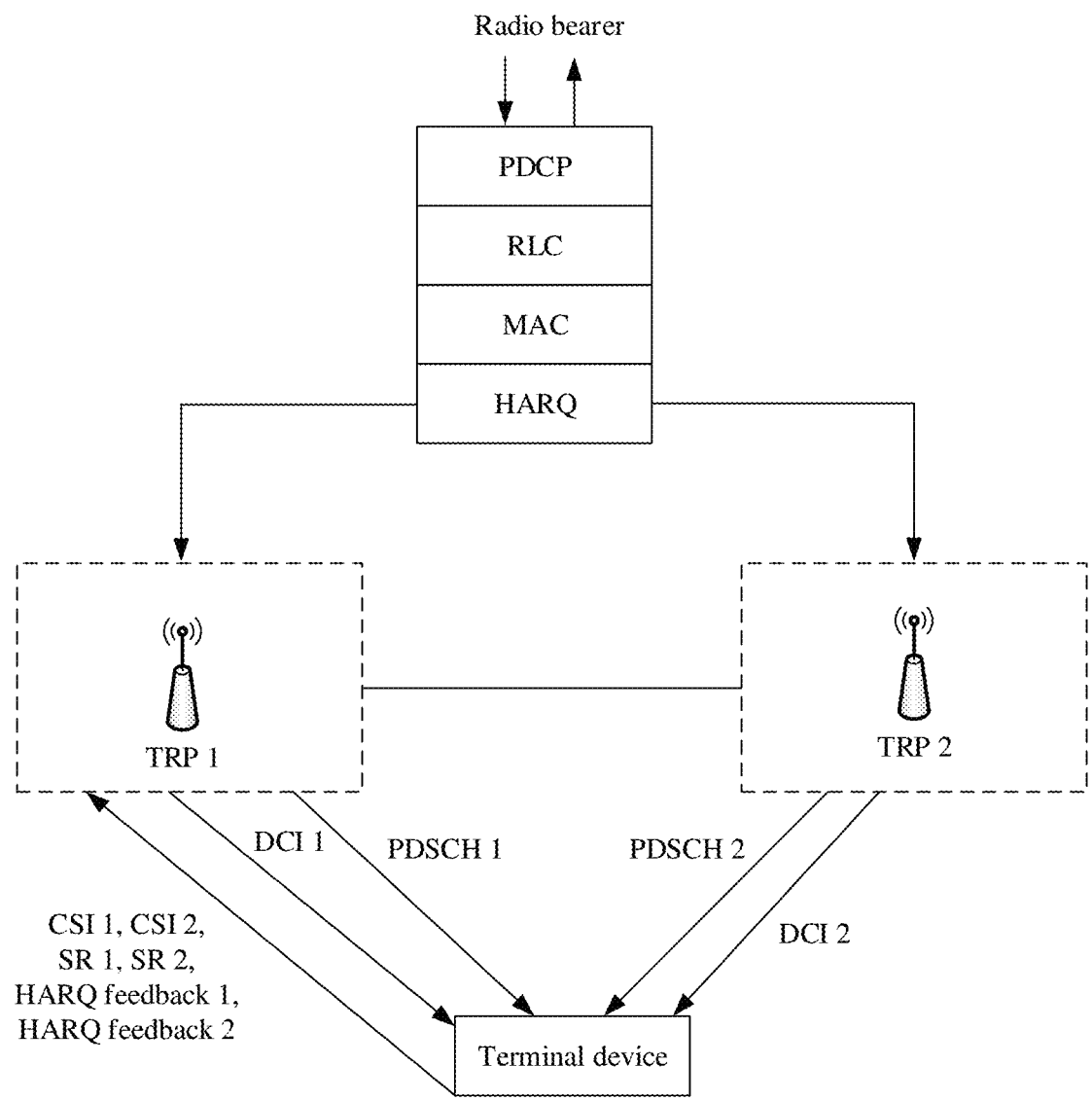
Figure 6:
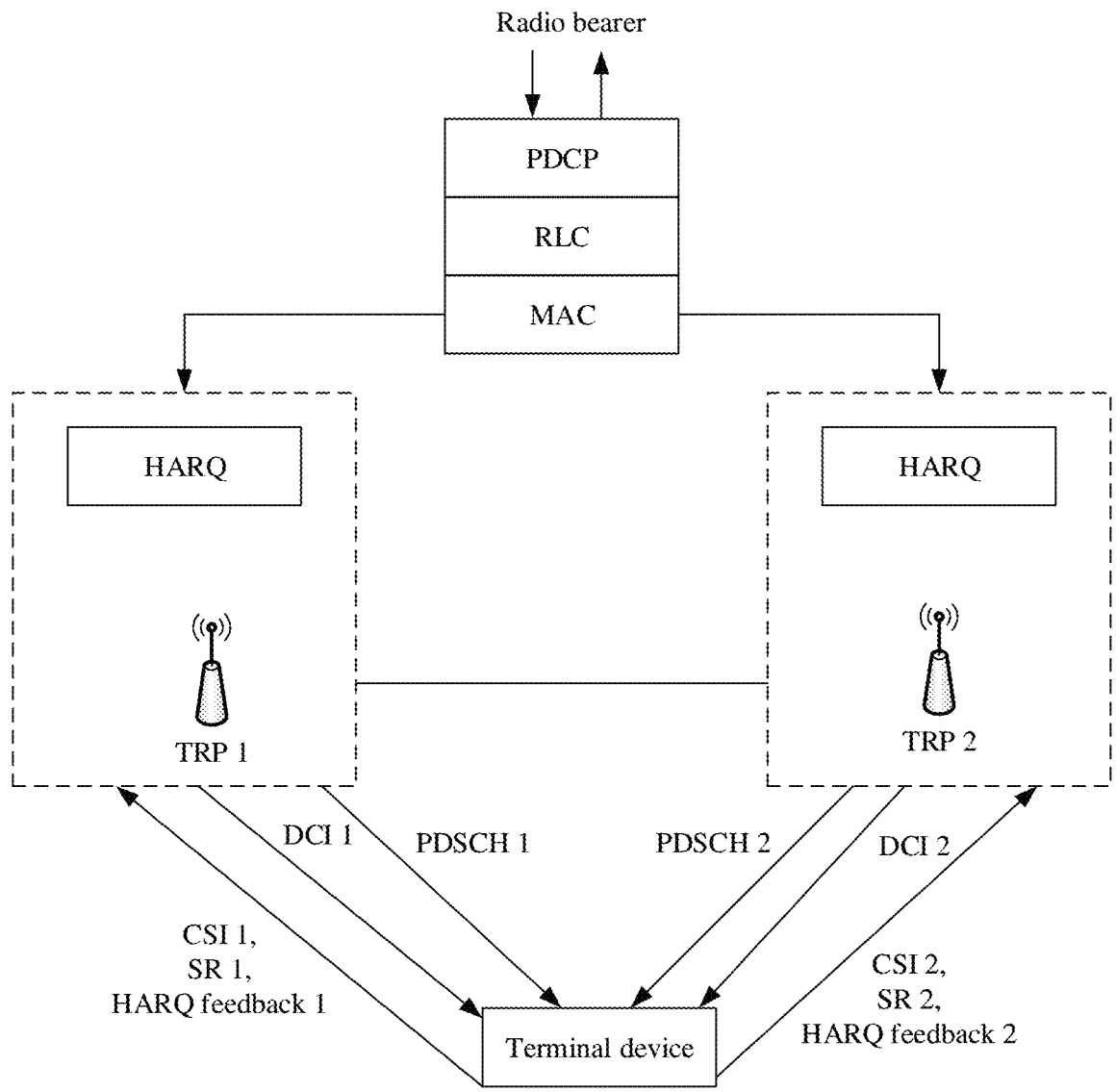

The following describes the scenario of multi-transmission-reception-point transmission in a cell. Two-transmission-reception-point (TRP) transmission in a cell is used as an example. FIG. 4 to FIG. 6 are diagrams of three possible user plane protocol stack architectures. The protocol stack architectures shown in FIG. 4 to FIG. 6 are all applicable to the scenario in which multi-transmission-reception-point transmission in a cell is supported. The following separately describes the protocol stack architectures. The plurality of transmission reception points may communicate with each other through ideal backhaul, or may communicate with each other through non-ideal backhaul. This is not limited.

The plurality of transmission reception points, or referred to as a plurality of transmission points, namely, a plurality of TRPs, may be understood as a group of antennas at a geographical location. That there are a plurality of TRPs in a cell may be understood that when the cell sends downlink information to a terminal device, the cell may send information of each of the plurality of TRPs by using the TRP.

It is assumed that there are N TRPs in a cell, where N is an integer greater than 2 or equal to 2. The N TRPs in the cell each may communicate with a terminal device through a link or a channel. In other words, the cell includes N links or N channels. The N TRPs in the cell may also be understood as N channels through which each of the N TRPs in the cell communicates with the terminal device.

It should be understood that the protocol stack architectures shown in FIG. 4 to FIG. 6 are all applicable to the scenario of two-transmission-reception-point transmission in a cell. A protocol stack architecture supporting multi-transmission-reception-point transmission in a cell may be obtained by analogy, and details are not described.

The protocol stack architecture shown in FIG. 4 is similar to the protocol stack architecture for DC, and the protocol stack architecture shown in FIG. 4 may be referred to as a dual-connectivity-like architecture or a multi-connectivity-like architecture. Therefore, in the following embodiments, the protocol stack architecture shown in FIG. 4 is referred to as a multi-connectivity architecture for short. When there are two TRPs in a cell, the protocol stack architecture may be referred to as a dual-connectivity-like architecture. When there are three TRPs in a cell, the protocol stack architecture may be referred to as a triple-connectivity-like architecture or a multi-connectivity-like architecture. It should be understood that naming of the multi-connectivity-like architecture or the dual-connectivity-like architecture should not constitute any limitation on this application. This application does not exclude a possibility of defining another name in a future protocol to represent a same or similar meaning.

In FIG. 4, two TRPs denoted as a TRP 1 and a TRP 2 are used as an example for description.

As shown in FIG. 4, for one radio bearer (RB), a protocol stack architecture on a network device side is as follows: The TRP 1 and the TRP 2 share one PDCP entity, and the TRP 1 and the TRP 2 each have a separate (physical, PHY) layer entity, MAC entity, and RLC entity. In addition, the TRP 1 and the TRP 2 each have a MAC scheduler and a HARQ entity. In the embodiments of this application, the MAC scheduler has functions such as resource allocation and scheduling, and can implement a scheduling function of the MAC entity. The MAC scheduler may be considered as a functional module of the MAC entity, in other words, the MAC scheduler may belong to the MAC entity. This is not limited. In the following descriptions, the MAC scheduler is not described in detail again. A TRP with a MAC scheduler may be considered as a primary TRP, in other words, a TRP to which a MAC scheduler belongs is considered as a primary TRP, or a TRP corresponding to a MAC scheduler is considered as a primary TRP, or a TRP with a MAC scheduling function is considered as a primary TRP. This is not limited. A protocol stack architecture on a terminal device side may be consistent with the protocol stack architecture on the network device side. For example, for an RB that is configured by the network device and that is allowed to use a serving cell, when the network device side includes one PDCP entity, two MAC entities, and two RLC entities, the terminal device side also includes one PDCP entity, two MAC entities, and two RLC entities. Details are not described again.

In the architecture shown in FIG. 4, the TRP 1 and the TRP 2 each may send downlink control information (DCI), and independently schedule a physical downlink shared channel (PDSCH) and a physical uplink shared channel (PUSCH). The terminal device may separately send corresponding uplink control information (UCI) to the TRP 1 and the TRP 2. The uplink control information includes but is not limited to at least one of the following: a scheduling request (SR), channel state information (CSI), and a HARQ feedback. For example, in FIG. 4, the TRP 1 may send DCI and a PDSCH to the terminal device, which are respectively denoted as DCI 1 and a PDSCH 1 for differentiation, and the terminal device may also send CSI, an SR, and a HARQ feedback to the TRP 1, which are respectively denoted as CSI 1, an SR 1, and a HARQ feedback 1 for differentiation, the TRP 2 may send DCI and a PDSCH to the terminal device, which are respectively denoted as DCI 2 and a PDSCH 2 for differentiation, and the terminal device may also send CSI, an SR, and a HARQ feedback to the TRP 2, which are respectively denoted as CSI 2, an SR 2, and a HARQ feedback 2 for differentiation.

The protocol stack architecture shown in FIG. 5 is similar to a user plane protocol stack architecture during single-cell communication. Therefore, in the following embodiments, a protocol stack architecture similar to that shown in FIG. 5 is referred to as a first single-cell-like architecture for short. It should be understood that naming of the first single-cell-like architecture should not constitute any limitation on this application. This application does not exclude a possibility of defining another name to represent a same or similar meaning in a future protocol.

In FIG. 5, a TRP 1 and a TRP 2 are still used as an example for description.

As shown in FIG. 5, for one RB, a protocol stack architecture on a network device side is as follows: The TRP 1 and the TRP 2 share one PDCP entity, one RLC entity, and one MAC entity, and the TRP 1 and the TRP 2 share one HARQ entity. In an example, a MAC scheduler may be located in the TRP 1. In this case, the TRP 1 may be considered as a primary TRP. Correspondingly, a link through which the TRP 1 communicates with a terminal device may also be referred to as a primary link, and the MAC scheduler of the TRP 1 is responsible for transmission scheduling for both the TRP 1 and the TRP 2. Alternatively, in another example, a MAC scheduler may be located in the TRP 2. In this case, the TRP 2 may be considered as a primary TRP. Correspondingly, a link through which the TRP 2 communicates with the terminal device may also be referred to as a primary link, and the MAC scheduler of the TRP 2 is responsible for transmission scheduling for both the TRP 1 and the TRP 2. For ease of understanding, FIG. 5 shows only one case. A protocol stack architecture on the terminal device side may be consistent with that on the network device side. Details are not described again.

In the architecture shown in FIG. 5, the two TRPs each may send DCI, and independently schedule a PDSCH and a PUSCH, and the terminal device sends uplink control information only to the TRP 1 (namely, the primary TRP), to be specific, the terminal device sends, to the TRP 1, uplink control information corresponding to the TRP 1 and uplink control information corresponding to the TRP 2. The uplink control information includes but is not limited to an SR, CSI, and a HARQ feedback. For example, in FIG. 5, the TRP 1 may send DCI and a PDSCH to the terminal device, which are respectively denoted as DCI 1 and a PDSCH 1 for differentiation, the TRP 2 may send DCI and a PDSCH to the terminal device, which are respectively denoted as DCI 2 and a PDSCH 2 for differentiation, and the terminal device may also send, to the TRP 1, CSI, an SR, and a HARQ feedback corresponding to the TRP 1, which are respectively denoted as CSI 1, an SR 1, and a HARQ feedback 1 for differentiation, and the terminal device may also send, to the TRP 1, CSI, an SR, and a HARQ feedback corresponding to the TRP 2, which are respectively denoted as CSI 2, an SR 2, and a HARQ feedback 2 for differentiation.

The protocol stack architecture shown in FIG. 6 is similar to the protocol stack architecture for CA. Therefore, in the following embodiments, a protocol stack architecture similar to that shown in FIG. 6 is referred to as a carrier-aggregation-like architecture for short. It should be understood that naming of the carrier-aggregation-like architecture should not constitute any limitation on this application. This application does not exclude a possibility of defining another name in a future protocol to represent a same or similar meaning.

In FIG. 6, a TRP 1 and a TRP 2 are still used as an example for description.

As shown in FIG. 6, for one RB, a protocol stack architecture on a network device side is as follows: The TRP 1 and the TRP 2 share one PDCP entity, one RLC entity, and one MAC entity, and the TRP 1 and the TRP 2 each have a corresponding PHY entity and HARQ entity. A MAC scheduler is located in the TRP 1 (the TRP 1 is considered as a primary TRP, and correspondingly, the link through which the TRP 1 communicates with a terminal device may also be considered as a primary link). The MAC scheduler of the TRP 1 is responsible for transmission scheduling for both the TRP 1 and the TRP 2. A protocol stack architecture on the terminal device side may be consistent with that on the network device side. Details are not described again. In FIG. 6, the TRP 2 may also implement a virtual MAC scheduler, so that transmission scheduling on the TRP 2 side can be processed in a timely manner, but the virtual MAC scheduler needs to operate under control of the MAC scheduler of the TRP 1. There is a primary-secondary relationship between the MAC scheduler of the TRP 1 and the virtual MAC scheduler of the TRP 2. To be specific, the TRP 1 is considered as a primary TRP, and the TRP 2 is considered as a secondary TRP.

In the architecture shown in FIG. 6, the two TRPs each may send DCI, and independently schedule a PDSCH and a PUSCH. The terminal device may separately send corresponding uplink control information to the two TRPs. The uplink control information includes but is not limited to an SR, CSI, and a HARQ feedback. For example, in FIG. 6, the TRP 1 may send DCI and a PDSCH to the terminal device, which are respectively denoted as DCI 1 and a PDSCH 1 for differentiation, and the terminal device may also send CSI, an SR, and a HARQ feedback to the TRP 1, which are respectively denoted as CSI 1, an SR 1, and a HARQ feedback 1 for differentiation, the TRP 2 may send DCI and a PDSCH to the terminal device, which are respectively denoted as DCI 2 and a PDSCH 2 for differentiation, and the terminal device may also send CSI, an SR, and a HARQ feedback to the TRP 2, which are respectively denoted as CSI 2, an SR 2, and a HARQ feedback 2 for differentiation.

The architectures in FIG. 4 to FIG. 6 may be used in multi-transmission-reception-point transmission in a cell. This application provides another architecture that may be used in multi-transmission-reception-point transmission in a cell. The protocol stack architecture provided in this application is similar to a user plane protocol stack architecture during single-cell communication. Therefore, in the following embodiments, the protocol stack architecture provided in this application is referred to as a second single-cell-like architecture for short. It should be understood that naming of the second single-cell-like architecture should not constitute any limitation on this application. This application does not exclude a possibility of defining another name in a future protocol to represent a same or similar meaning.

Figure 7:
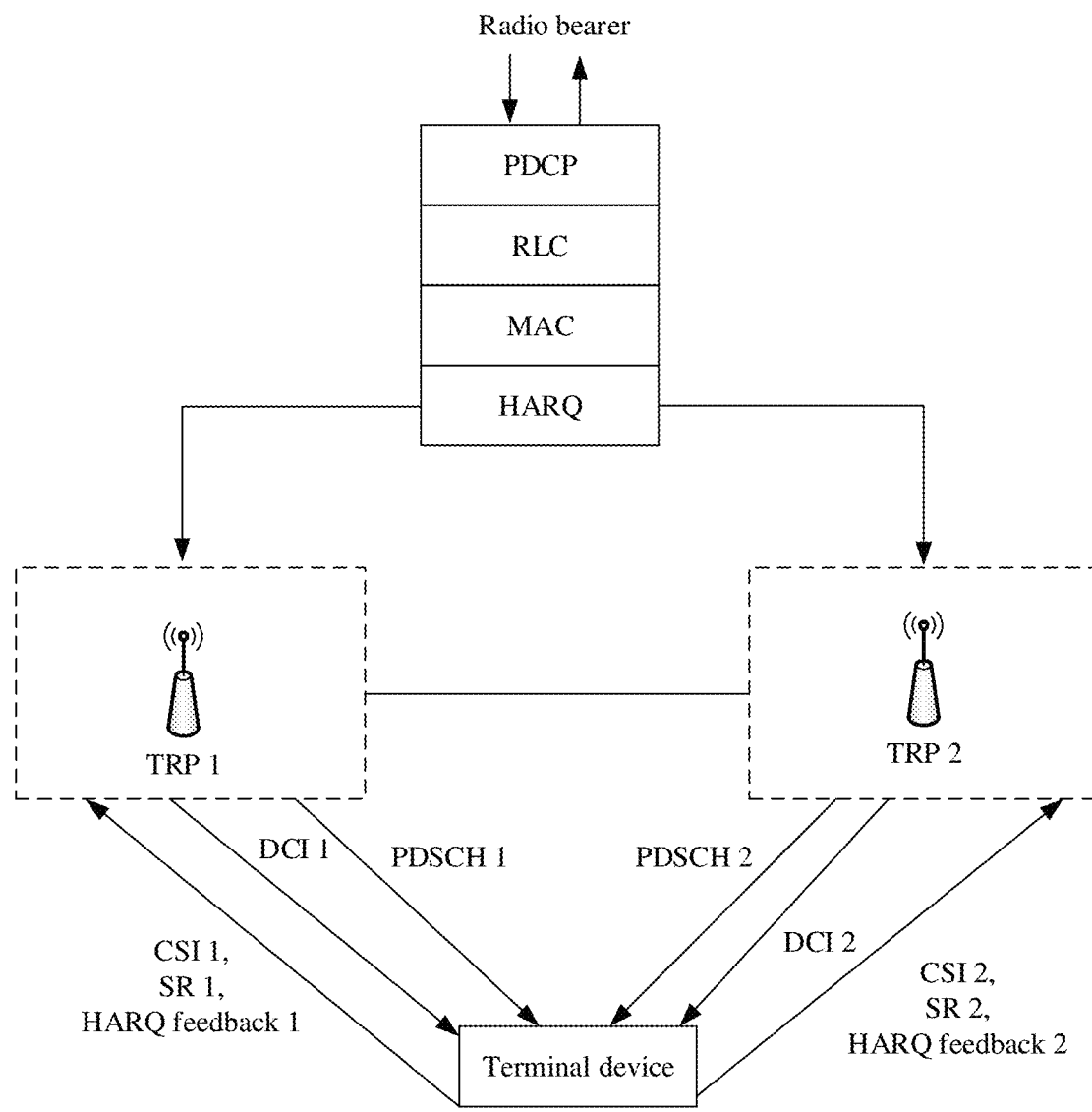
FIG. 7 is a schematic diagram of a protocol stack architecture according to an embodiment of this application.

The following describes the protocol stack architecture provided in this application by using a TRP 1 and a TRP 2 as an example and with reference to FIG. 7. A protocol stack architecture shown in FIG. 7 is applicable to a scenario in which two-TRP transmission in a cell is supported. A protocol stack architecture supporting multi-TRP transmission in a cell may be obtained by analogy. For example, in a scenario in which three-TRP transmission in a cell needs to be supported, for one RB, a protocol stack architecture on a network device side is as follows: Three TRPs share one PDCP entity, one RLC entity, and one MAC entity, and the three TRPs share one HARQ entity. A protocol stack architecture on a terminal device side may be consistent with the protocol stack architecture on the network device side.

As shown in FIG. 7, for one RB, a protocol stack architecture on the network device side is as follows: The TRP 1 and the TRP 2 share one PDCP entity, one RLC entity, and one MAC entity, and the TRP 1 and the TRP 2 share one HARQ entity. That the TRP 1 and the TRP 2 share one PDCP entity, one RLC entity, and one MAC entity means that the PDCP entity is used by both the TRP 1 and the TRP 2, the RLC entity is used by both the TRP 1 and the TRP 2, and the MAC entity is used by both the TRP 1 and the TRP 2. That the TRP 1 and the TRP 2 share one HARQ entity means that a unique HARQ entity corresponding to the RB is used by both the TRP 1 and the TRP 2.

In an example, a MAC scheduler is located in the TRP 1. In this case, the TRP 1 may be considered as a primary TRP. Correspondingly, a link through which the TRP 1 communicates with a terminal device may also be referred to as a primary link, and the MAC scheduler of the TRP 1 is responsible for transmission scheduling for both the TRP 1 and the TRP 2. A protocol stack architecture on the terminal device side may be consistent with the protocol stack architecture on the network device side. Details are not described again.

In FIG. 7, the TRP 2 may also implement a virtual MAC scheduler and process transmission scheduling on the TRP 2 side, but the virtual MAC scheduler needs to operate under control of the MAC scheduler of the TRP 1. There may be a primary-secondary relationship between the MAC scheduler of the TRP 1 and the virtual MAC scheduler of the TRP 2. To be specific, the TRP 1 is considered as a primary TRP, and the TRP 2 is considered as a secondary TRP. Correspondingly, a link through which the TRP 1 communicates with the terminal device may also be referred to as a primary link, and a link through which the TRP 2 communicates with the terminal device may also be referred to as a secondary link.

In the architecture shown in FIG. 7, the two TRPs each may send DCI, and independently schedule a PDSCH and a PUSCH. In the protocol stack architecture provided in this embodiment of this application, a plurality of sets of PUCCH configurations are configured, and are separately used for the terminal device to send corresponding uplink control information to a plurality of TRPs. For example, two sets of PUCCH configurations are configured. The terminal device may separately send uplink control information to the TRP 1 and the TRP 2 by using corresponding PUCCH configurations. To be specific, the terminal device sends, to the TRP 1, uplink control information corresponding to the TRP 1, and sends, to the TRP 2, uplink control information corresponding to the TRP 2. The uplink control information includes but is not limited to an SR, CSI, and a HARQ feedback. For example, in FIG. 7, the TRP 1 may send DCI and a PDSCH to the terminal device, which are respectively denoted as DCI 1 and a PDSCH 1 for differentiation, the TRP 2 may send DCI and a PDSCH to the terminal device, which are respectively denoted as DCI 2 and a PDSCH 2 for differentiation, and the terminal device may also send, to the TRP 1, CSI, an SR, and a HARQ feedback corresponding to the TRP 1, which are respectively denoted as CSI 1, an SR 1, and a HARQ feedback 1 for differentiation, and the terminal device may also send, to the TRP 2, CSI, an SR, and a HARQ feedback corresponding to the TRP 2, which are respectively denoted as CSI 2, an SR 2, and a HARQ feedback 2 for differentiation.

With the protocol stack architecture provided in this embodiment of this application, a waste of resources, such as storage and computing resources, of the terminal device can be reduced, and a decrease in a throughput of the terminal device can also be avoided. In the architecture shown in FIG. 7, for an RB that is configured by a network and that is allowed to use a serving cell, an RLC entity, a MAC entity, and a HARQ entity do not need to be separately generated for each transmission reception point, thereby avoiding occupying more resources such as storage and computing resources. In addition, in the architecture shown in FIG. 7, the TRP 2 may directly receive the HARQ feedback that is sent by the terminal device and that corresponds to the TRP 2, thereby avoiding a delay in HARQ retransmission and a decrease in a throughput. In addition, in the architecture shown in FIG. 7, for an RB that is configured by the network device and that is allowed to use the serving cell, a HARQ entity does not need to be separately generated for each transmission reception point, thereby avoiding occupying more resources such as storage and computing resources.

The protocol stack architecture provided in this application is described in detail in the following embodiments.

It should be noted that the second single-cell-like architecture provided in this application and the first single-cell-like architecture shown in FIG. 5 may be collectively referred to as a single-cell-like architecture or a single-carrier-like architecture. The terms "first" and "second" are merely used for naming different architectures for differentiation. It should be understood that naming of the single-cell-like architecture or the single-carrier-like architecture should not constitute any limitation on this application. This application does not exclude a possibility of defining another name in a future protocol to represent a same or similar meaning.

Figure 8:
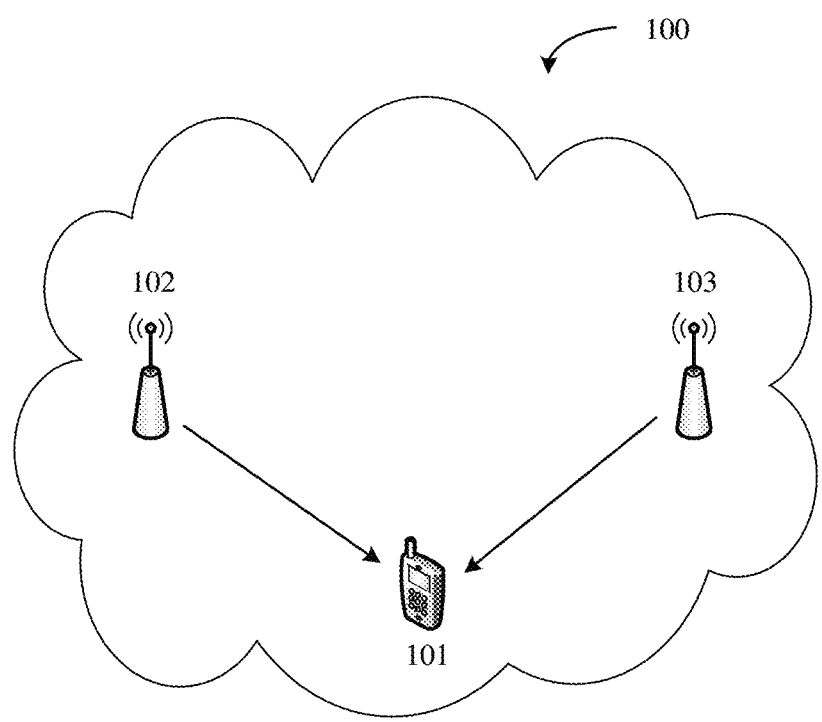
FIG. 8 is a schematic diagram of a communications system to which an embodiment of this application is applicable.

FIG. 8 is a schematic diagram of a system 100 to which a communication method according to an embodiment of this application is applicable. As shown in FIG. 8, the communications system 100 may include at least one terminal device, for example, a terminal device 101 shown in the figure, and the communications system 100 may further include at least two transmission reception points, for example, a transmission reception point #1 102 and a transmission reception point #2 103 shown in the figure. The transmission reception point #1 102 and the transmission reception point #2 103 may be transmission nodes in one cell.

In the communications system 100, the transmission reception point #1 102 and the transmission reception point #2 103 may communicate with each other through a backhaul (backhaul) link. The backhaul link may be a wired backhaul link (for example, an optical fiber or a copper cable), or may be a wireless backhaul link (for example, a microwave). The transmission reception point #1 102 and the transmission reception point #2 103 may collaborate with each other to provide a service for the terminal device 101. Therefore, the terminal device 101 may separately communicate with the transmission reception point #1 102 and the transmission reception point #2 103 through a radio link.

Based on a communication delay between transmission reception points, backhaul may be classified into ideal backhaul and non-ideal backhaul. A communication delay between two transmission nodes in the ideal backhaul may be at a microsecond level, and may be ignored compared with millisecond-level scheduling in NR. A communication delay between two transmission nodes in the non-ideal backhaul may be at a millisecond level, and cannot be ignored compared with the millisecond-level scheduling in NR. The protocol stack architectures shown in FIG. 4 to FIG. 6 and the protocol stack architecture that is shown in FIG. 7 and that is provided in this application may all be used in the communications system 100.

In addition, the communications system 100 may be a PLMN network, a D2D network, an M2M network, an IoT network, or another network. FIG. 8 is merely a simplified schematic diagram as an example, and the network may further include other network devices that are not shown in FIG. 8.

It should be understood that FIG. 1 to FIG. 8 are merely examples for description, and should not constitute any limitation on this application. For example, the communications system may further include a core network device. The core network device may be connected to a plurality of access network devices to control the access network devices.

For ease of understanding the embodiments of this application, the following descriptions are provided.

1. In the embodiments of this application, a higher layer parameter is mentioned in a plurality of cases, and the higher layer parameter may be included in higher layer signaling. For example, the higher layer signaling may be a radio resource control (RRC) message, or may be other higher layer signaling. This is not limited in this application.

2. In the embodiments of this application, "used to indicate" may include being used for a direct indication and being used for an indirect indication, or may include an explicit indication and an implicit indication. Information indicated by specific information (configuration information in the following descriptions) is referred to as to-be-indicated information. In a specific implementation process, the to-be-indicated information may be indicated in a plurality of manners, for example, but not limited to, directly indicating the to-be-indicated information, for example, the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information may be known, or agreed upon in advance. For example, it may alternatively be agreed upon in advance (for example, specified in a protocol) that the to-be-indicated information is to be indicated depending on whether an information element exists, thereby reducing indication overheads to some extent.

3. In the embodiments of this application, a description of A and B being associated or associated A and B may indicate that there is an association relationship between A and B. Therefore, "A and B are associated" and "there is an association relationship between A and B" may express a same meaning, in other words, may be interchangeable. For example, that M sets of downlink control channel-related configuration parameters are in a one-to-one association with M sets of uplink control channel-related configuration parameters may indicate that there is an association relationship between the downlink control channel-related configuration parameters and the uplink control channel-related configuration parameters, that is, each set of downlink control channel-related configuration parameters is associated with one set of uplink control channel-related configuration parameters. For brevity, examples are not described herein one by one.

4. In the embodiments of this application, "corresponding to" is mentioned for a plurality of times, for example, "a PDCCH configuration corresponding to DCI", which indicates a PDCCH configuration based on which a network device (for example, a network device to which a TRP belongs) or a transmission reception point (for example, a TRP) sends the DCI, or indicates that a terminal device performs detection on a space/time-frequency resource determined based on the PDCCH configuration, and further obtains the DCI through parsing. In the embodiments of this application, a PDCCH is a channel/bearer, and DCI is information carried on the PDCCH. For example, a terminal device determines a candidate space/time-frequency resource based on a PDCCH configuration configured by a network device, and the terminal device performs PDCCH detection on the configured candidate space/time-frequency resource, and parses a PDCCH after detecting the PDCCH, to obtain DCI information carried on the PDCCH.

5. First, second, third, fourth, and various numbers in the following embodiments are merely used for differentiation for ease of description, and are not used to limit the scope of the embodiments of this application, for example, are used to distinguish between different TRPs or different architectures.

6. In the following embodiments, "pre-obtaining" may include being indicated by a network device through signaling, or being predefined, for example, being defined in a protocol. The "predefining" may be implemented by pre-storing corresponding code or a table on a device (for example, including a terminal device and a network device), or in another manner that may be used to indicate related information. A specific implementation thereof is not limited in this application.

7. "Storing" in the embodiments of this application may mean being stored in one or more memories. The one or more memories may be separately disposed, or may be integrated into an encoder, a decoder, a processor, or a communications apparatus. Alternatively, some of the one or more memories may be separately disposed, and the others are integrated into an encoder, a decoder, a processor, or a communications apparatus. A type of the memory may be a storage medium in any form. This is not limited in this application.

8. A "protocol" in the embodiments of this application may be a standard protocol in the communications field, for example, may include an LTE protocol, an NR protocol, and a related protocol used in a future communications system. This is not limited in this application.

9. "At least one" means one or more, and "plurality" means at least two. "And/or" describes an association relationship for describing associated objects and represents that three relationships may exist. For example, A and/or B may represent the following three cases: Only A exists, both A and B exist, and only B exists, where A and B may be in a singular or plural form. The character "/" generally indicates an "or" relationship between the associated objects. "At least one of the following" or a similar expression thereof indicates any combination of the following, and includes any combination of one or more of the following. For example, at least one of a, b, and c may indicate a, b, c, a and b, a and c, b and c, or a, b, and c, where a, b, or c may be singular or plural.

The following describes in detail the embodiments provided in this application with reference to the accompanying drawings.

It should be understood that the communication method provided in this application is applicable to a wireless communications system, for example, the wireless communications system 100 shown in FIG. 8. A terminal device in the embodiments of this application may simultaneously communicate with one or more network devices. For example, a network device in the embodiments of this application may correspond to a network device to which the transmission reception point #1 102 and the transmission reception point #2 103 in FIG. 8 belong (that is, a network device to which the transmission reception point #1 102 belongs and a network device to which the transmission reception point #2 103 belongs are a same network device). Alternatively, a network device in the embodiments of this application may correspond to a network device to which the transmission reception point #1 102 in FIG. 8 belongs or a network device to which the transmission reception point #2 103 in FIG. 8 belongs (that is, the network device to which the transmission reception point #1 102 belongs and the network device to which the transmission reception point #2 103 belongs are different network devices). The terminal device in the embodiments of this application may correspond to the terminal device 101 in FIG. 8. The embodiments are described by using an example in which the network device corresponds to the network device to which the transmission reception point #1 102 and the transmission reception point #2 103 in FIG. 8 belong (that is, the network device to which the transmission reception point #1 102 belongs and the network device to which the transmission reception point #2 103 belongs are a same network device).

Without loss of generality, the following describes the embodiments of this application in detail by using an interaction process between a terminal device and a network device as an example. Alternatively, this may be understood as that a terminal device interacts with a serving cell of a network device, and the terminal device may be any terminal device that is in a wireless communications system and that has a wireless connection relationship with one or more serving cells. Alternatively, this may be understood as that a terminal device interacts with a plurality of transmission reception points in a serving cell, and the terminal device may be any terminal device that is in a wireless communications system and that has a wireless connection relationship with one or more transmission reception points. It may be understood that any terminal device in the wireless communications system can implement wireless communication according to a same technical solution. This is not limited in this application.

It may be understood that, in the embodiments of this application, the terminal device and/or the network device, or the terminal device and/or the transmission reception point may perform some or all steps in the embodiments of this application. These steps or operations are merely examples. In the embodiments of this application, other operations or variations of various operations may be further performed. In addition, the steps may be performed in different sequences presented in the embodiments of this application, and not all operations in the embodiments of this application need to be performed.

It should be understood that a protocol stack architecture to which the embodiments of this application are applicable may be shown in FIG. 4 to FIG. 7, but is not limited to the protocol stack architectures shown in FIG. 4 to FIG. 7. The embodiments of this application are also applicable to another protocol stack architecture capable of implementing multi-transmission-reception-point (for example, multi-TRP) transmission in a cell.

Figure 9:
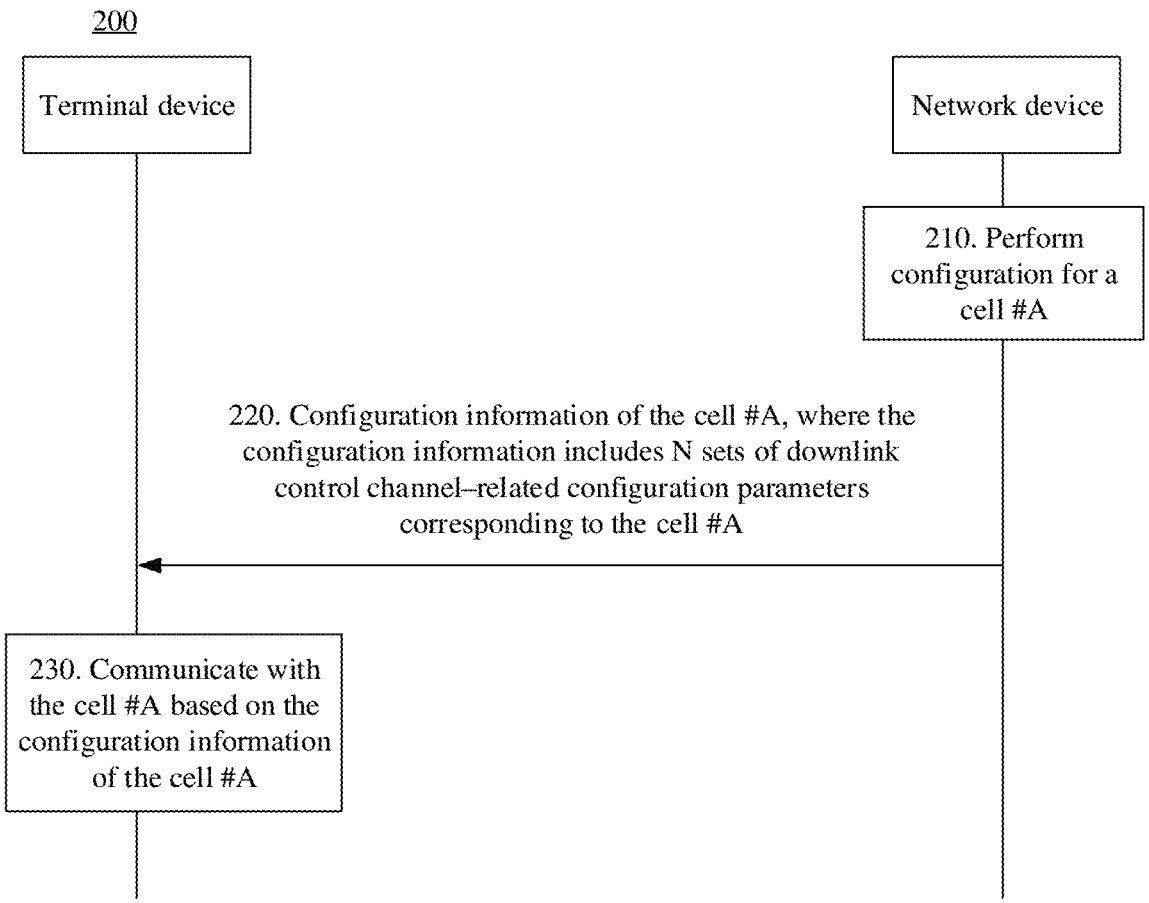
FIG. 9 is a schematic interaction diagram of a communication method according to an embodiment of this application.

FIG. 9 is a schematic interaction diagram of a communication method 200 according to an embodiment of this application. The method 200 includes the following steps.

S210. A network device performs configuration for a cell #A.

The cell #A (that is, an example of a serving cell) is a cell that supports multi-transmission-reception-point (TRP) transmission. In the following descriptions, for brevity and without loss of generality, a cell that supports multi-transmission-reception-point transmission is denoted as the cell #A.

The cell #A includes N TRPs, and N is an integer greater than or equal to 2. That the network device performs configuration for the cell #A may be understood as that the network device performs configuration for the N TRPs in the cell #A, or may be understood as that the network device configures a set of downlink control channel-related configuration parameters for each TRP in the cell #A, or may be understood as that the network device configures a set of downlink control channel-related configuration parameters and configures a set of uplink control channel-related configuration parameters for each TRP in the cell #A. It should be understood that each set of configuration parameters includes a same type of parameter. The following provides descriptions with reference to specific configuration parameters.

By way of example and not limitation, in this application, the network device may perform configuration for the N TRPs in any one of the following manners.

Manner 1: The cell #A is configured as a serving cell including N sets of downlink control channel-related configuration parameters, where the N sets of downlink control channel-related configuration parameters correspond to the N TRPs. This manner may also be referred to as a single-cell configuration manner.

Manner 2: The cell #A is configured as N intra-frequency cells, each intra-frequency cell includes a set of downlink control channel-related configuration parameters, and each intra-frequency cell corresponds to one TRP. This manner may also be referred to as a multi-cell configuration manner. Each intra-frequency cell may correspond to same frequency information and/or same cell identification information.

The frequency information may include at least one of the following: a synchronization signal block (synchronization signal block, SSB) absolute frequency (absoluteFrequencySSB), a Point A absolute frequency (absoluteFrequencyPointA), a frequency band list (frequencyBandList), a subcarrier spacing (subcarrier spacing, SCS)-specific carrier list (scs-SpecificCarrierList), and the like.

The cell identification information may include at least one of the following: a cell global identifier (CGI), a physical cell identifier (PCI), a serving cell index (for example, ServCellIndex), and a cell group identifier (for example, Cell Group Id).

The manner 1, the manner 2, and the configuration parameters are described in detail in the following embodiments.

S220. The network device sends configuration information of the cell #A to a terminal device, and correspondingly, the terminal device receives the configuration information of the cell #A that is sent by the network device.

The configuration information includes the N sets of downlink control channel-related configuration parameters corresponding to the cell #A. Each set of downlink control channel-related configuration parameters includes a same type of parameter. For example, when the configuration parameters include a PDCCH configuration, each set of downlink control channel-related configuration parameters includes a PDCCH configuration.

Optionally, the configuration information may further include M sets of uplink control channel-related configuration parameters corresponding to the cell #A. M is an integer greater than 1 or equal to 1, and M is less than or equal to N.

The M sets of uplink control channel-related configuration parameters and M sets of downlink control channel-related configuration parameters are in a one-to-one association, and are respectively used for feeding back uplink information and receiving downlink information.

In a possible implementation, using the protocol stack architecture shown in FIG. 4, FIG. 6, or FIG. 7 as an example, M is equal to N. To be specific, the configuration information may include N sets of uplink control channel-related configuration parameters and the N sets of downlink control channel-related configuration parameters, that is, each TRP corresponds to one set of uplink control channel-related configuration parameters and one set of downlink control channel-related configuration parameters. Each TRP sends downlink information to the terminal device based on a corresponding downlink control channel-related configuration parameter. Correspondingly, the terminal device may also send uplink information to a corresponding TRP based on a corresponding uplink control channel-related configuration parameter.

In another possible implementation, using the protocol stack architecture shown in FIG. 5 as an example, M is less than N. To be specific, the configuration information may include the M sets of uplink control channel-related configuration parameters and the N sets of downlink control channel-related configuration parameters, and the M sets of uplink control channel-related configuration parameters correspond to M sets of configuration parameters in the N sets of downlink control channel-related configuration parameters. That is, in the N TRPs, M TRPs each correspond to one set of uplink control channel-related configuration parameters and one set of downlink control channel-related configuration parameters, and (N-M) TRPs each correspond to one set of downlink control channel-related configuration parameters. For example, using the protocol stack architecture shown in FIG. 5 as an example, the configuration information may include one set of uplink control channel-configuration parameters and two sets of downlink control channel-related configuration parameters. To be specific, in two TRPs, one TRP (the TRP 1 in FIG. 5) corresponds to one set of uplink control channel-related configuration parameters and one set of downlink control channel-related configuration parameters, and the other TRP (the TRP 2 in FIG. 5) corresponds to one set of downlink control channel-related configuration parameters. Therefore, the terminal device sends, to the TRP 1 by using the uplink control channel-related configuration parameters, uplink information corresponding to the TRP 1 and uplink information corresponding to the TRP 2.

S230. The terminal device communicates with the cell #A based on the configuration information of the cell #A.

Alternatively, this may be understood as that the terminal device communicates with the cell #A based on the N sets of downlink control channel-related configuration parameters, or this may be understood as that the terminal device communicates with the N TRPs in the cell #A based on the N sets of downlink control channel-related configuration parameters.

That the terminal device communicates with the cell #A may be understood as that the terminal device receives, from the cell #A, information that comes from a plurality of TRPs, and correspondingly, the plurality of TRPs each may send information to the terminal device. For example, the terminal device receives, on a time-frequency resource corresponding to the cell #A, the information that comes from the plurality of TRPs in the cell #A. The information sent by the plurality of TRPs may be the same or different.

Optionally, the configuration parameters include at least one of the following: a PDCCH configuration (for example, PDCCH config), cell identification information, a cell radio network temporary identifier (C-RNTI), a demodulation reference signal (DMRS), identifiers (for example, TRP IDs) corresponding to the N TRPs, beam set information, or beam information.

Optionally, the terminal device receives DCI from the cell #A, in other words, the terminal device receives DCI from a network device to which the cell #A belongs. A configuration parameter corresponding to the DCI belongs to one of the N sets of downlink control channel-related configuration parameters. The N sets of downlink control channel-related configuration parameters have an association relationship with the N TRPs, and the association relationship is indicated by using an explicit or implicit method.

In an example, an association relationship between the N sets of downlink control channel-related configuration parameters and the N TRPs or N links may be indicated by using an explicit method. The configuration information that is sent by the network device and that includes the N sets of downlink control channel-related configuration parameters corresponding to the cell #A may alternatively include information about a TRP or a link associated with each set of configuration parameters. In this case, the terminal device may determine, based on the configuration parameter corresponding to the received DCI, which TRP or link in the N TRPs or the N links in the cell #A is a TRP or a link that sends the DCI. The information about the TRP may be a TRP identifier (for example, a TRP ID), or another manner (for example, the information about the TRP may be a related parameter used to distinguish and identify a TRP). This is not limited. The information about the link may be a link identifier (for example, a link ID), or another method (for example, the information about the link may be a related parameter used to distinguish and identify a link). This is not limited.

In another example, an association relationship between the N sets of downlink control channel-related configuration parameters and the N TRPs or N links may be indicated by using an implicit method. For example, it is agreed upon in a protocol that, in the N sets of downlink control channel-related configuration parameters that are sent by the network device and that correspond to the cell #A, a first set of configuration parameters is associated with a first TRP or a first link (for example, denoted as a TRP 1 or a link 1) in the cell #A, a second set of configuration parameters is associated with a second TRP or a second link (for example, denoted as a TRP 2 or a link 2) in the cell #A, and so on. Details are not described. Alternatively, another agreement rule may be used. This is not limited. In this case, the terminal device may determine, based on the configuration parameter corresponding to the received DCI, which TRP or link in the N TRPs or the N links in the cell #A is a TRP or a link that sends the DCI.

Alternatively, in still another example, an association relationship between the N sets of downlink control channel-related configuration parameters and the N TRPs or N links may be indicated by using an information element or an information element structure. For example, in the configuration information that is sent by the network device and that includes the N sets of downlink control channel-related configuration parameters corresponding to the cell #A, an information element (or an information element structure) may be used to indicate information about a TRP or a link associated with each set of configuration parameters. In this case, the terminal device may determine, based on the configuration parameter corresponding to the received DCI, which TRP or link in the N TRPs or the N links in the cell #A is a TRP or a link that sends the DCI. For example, when the network device sends the N sets of downlink control channel-related configuration parameters corresponding to the cell #A, a first set of configuration parameters is indicated by a first-config information element, where the first-config information element includes a related parameter corresponding to the first set of configuration parameters, and the first set of configuration parameters corresponds to a first TRP or a first link, a second set of configuration parameters is indicated by a second-config information element, where the second-config information element includes a related parameter corresponding to the second set of configuration parameters, and the second set of configuration parameters corresponds to a second TRP or a second link, and so on. Details are not described. Alternatively, there may be another correspondence between an information element (or a configuration parameter corresponding to the information element) and a TRP (or a link). This embodiment is merely an example, and during implementation, the network device may have any implementation. It should be understood that the first-config information element and the second-config information element merely show a naming manner, and do not constitute a limitation.

In this embodiment of this application, the terminal device may distinguish a TRP from which received information (for example, DCI) comes. Alternatively, a transmission channel between each TRP and the terminal device may be considered as a link, and in this embodiment of this application, the terminal device may distinguish a link from which received information (for example, DCI) comes. If the terminal device needs to process information that comes from a plurality of TRPs, the terminal device needs to distinguish a TRP from which received information comes. For example, the terminal device distinguishes between PDCCHs corresponding to the plurality of TRPs to separately receive DCI sent by the plurality of TRPs, and the terminal device determines a TRP corresponding to received DCI. Further, the terminal device may receive downlink data from a corresponding physical downlink shared channel (PDSCH) based on the received DCI, or the terminal device may send uplink data to a PUSCH corresponding to the determined TRP, or the terminal device may perform uplink power control or the like on a physical uplink shared channel (PUSCH) or a physical uplink control channel (PUCCH) corresponding to the determined TRP. Distinguishing between PDCCHs or distinguishing between DCI is also critical to implementing an operation such as beam failure recovery for a specified TRP. Therefore, according to this embodiment of this application, a data transmission rate can be increased through multi-transmission-reception-point transmission.

The following provides detailed descriptions with reference to six possible cases.

Case 1: The configuration parameters include a PDCCH configuration.

The PDCCH configuration may be used to configure PDCCH parameters, for example, including a control resource set (CORESET), a search space, and another parameter that may be used to perform blind detection on a PDCCH. For example, the PDCCH configuration may be configured by using a PDCCH configuration control element (PDCCH-config information element, PDCCH-config IE) in a higher layer parameter.

The PDCCH configuration may be further used to determine a search space/time-frequency resource for PDCCH detection. Search spaces (or time-frequency resources) determined by using different PDCCH configurations are different. Each PDCCH configuration may include one or more control resource sets and one or more search spaces. Each control resource set and each search space may be further configured by using a higher layer parameter. For example, the PDCCH-config may include a control resource set control element (ControlResourceSet IE) and a search space control element (SearchSpace IE). The ControlResourceSet IE indicates a control resource set-related parameter, and the SearchSpace IE indicates a search space-related parameter. A candidate space/time-frequency resource for PDCCH detection may be determined based on the ControlResourceSet IE and/or the SearchSpace IE. Therefore, the terminal device may determine a candidate space/time-frequency resource based on a PDCCH configuration, and the terminal device performs PDCCH detection on the configured candidate space/time-frequency resource, and parses a PDCCH after detecting the PDCCH, to obtain DCI information carried on the PDCCH.

It should be understood that, merely for ease of understanding, the foregoing provides example descriptions by using the ControlResourceSet IE and the SearchSpace IE included in the PDCCH-config as an example, but this embodiment of this application is not limited thereto.

The configuration information includes the N sets of downlink control channel-related configuration parameters corresponding to the cell #A. In the case 1, the configuration information includes N sets of PDCCH configurations, and the N sets of PDCCH configurations correspond to the N TRPs, that is, each set of PDCCH configurations corresponds to one TRP, or the N sets of PDCCH configurations correspond to the N links, that is, each set of PDCCH configurations corresponds to one link.

In the case 1, for the terminal device, a PDCCH configuration corresponding to received DCI may be understood as a PDCCH configuration based on which the DCI is received, in other words, the terminal device performs PDCCH detection on a space/time-frequency resource determined based on the PDCCH configuration, and parses a PDCCH after detecting the PDCCH, to obtain the DCI, for the network device, a PDCCH configuration corresponding to DCI may be understood as a PDCCH configuration based on which the DCI is sent, in other words, the network device includes the DCI in a channel or a space/time-frequency resource corresponding to the PDCCH configuration.

In an example, in the case 1, the terminal device may determine, based on the PDCCH configuration corresponding to the DCI, a TRP or a link that sends the DCI.

In a possible implementation, N PDCCH locations of the N TRPs are configured on N different time-frequency resource blocks in a time-division multiplexing (TDM) manner, and when the terminal device detects/receives DCI on a time-frequency resource block, a TRP or a link that sends the DCI may be determined with reference to a first correspondence.

The first correspondence indicates a correspondence between the N PDCCH locations and the N different time-frequency resource blocks. The first correspondence may be sent by the network device to the terminal device, or may be prestored on the terminal device, or may be agreed upon in a protocol. This is not limited in this embodiment of this application.

For example, the cell #A includes two TRPs that are denoted as a TRP #1 and a TRP #2 for differentiation. Time-frequency resource blocks to which PDCCH locations of the TRP #1 and the TRP #2 belong are denoted as K1 and K2. In this way, the terminal device knows that information received from K1 is information sent by the TRP #1, and information received from K2 is information sent by the TRP #2.

In another possible implementation, each set of configuration parameters (for example, a PDCCH configuration) may be associated with an identifier (identify, ID), and the identifier may be an index value, a TRP ID, or another value. This is not limited. The identifier may be sent by the network device to the terminal device or specified in a protocol. In other words, the N sets of configuration parameters (for example, the N PDCCH configurations) each correspond to one identifier. DCI sent by a transmission reception point (for example, a TRP) may include the identifier. The terminal device may determine, based on the identifier included in the received DCI and with reference to a second correspondence, the TRP or a link that sends the DCI.

The second correspondence indicates a correspondence between the N sets of configuration parameters (for example, the N PDCCH configurations) and N different identifiers. The second correspondence may be sent by the network device to the terminal device, or may be prestored on the terminal device, or may be specified in a protocol. This is not limited in this embodiment of this application.

For example, the cell #A includes a TRP #1 and a TRP #2. In an example, identifiers associated with PDCCH configurations corresponding to the TRP #1 and the TRP #2 are denoted as an index 1 and an index 2. In this way, the terminal device knows that information carrying the index 1 is information sent by the TRP #1 (for example, the information is DCI), and information carrying the index 2 is information sent by the TRP #2 (for example, the information is DCI).

Alternatively, in another example, in the case 1, the terminal device may determine, based on a control resource set-related parameter and/or a search space-related parameter corresponding to received DCI, a TRP or a link that sends the DCI.

Specifically, the configuration information includes the N sets of downlink control channel-related configuration parameters corresponding to the cell #A. The configuration information includes one set of PDCCH configurations, and the set of PDCCH configurations includes a control resource set-related parameter and a search space-related parameter that correspond to each of the N links (or the N TRPs). Optionally, a control resource set-related parameter of each link (or each TRP) may be associated with an identifier, and a search space-related parameter of each link (or each TRP) may also be associated with an identifier. For example, the set of PDCCH configurations includes N sets of first parameters, and each set of first parameters (for example, the first parameters include a control resource set-related parameter and/or a search space-related parameter) corresponds to one TRP (or one link). That is, in the N sets of first parameters, control resource set-related parameters and/or search space-related parameters included in any two sets of first parameters are different, to distinguish between different TRPs (or links). Therefore, the terminal device may determine, based on a control resource set-related parameter and/or a search space-related parameter corresponding to received DCI, a TRP or a link that sends the DCI.

For example, N=2, and the terminal device communicates with the TRP #1 and the TRP #2 in the serving cell #A. The configuration information provided by the network device includes two sets of downlink control channel-related configuration parameters corresponding to the cell #A. The configuration information includes one set of PDCCH configurations, and the set of PDCCH configurations includes a control resource set-related parameter and a search space-related parameter that correspond to each of two links (or the two TRPs). It is assumed that a control resource set-related parameter corresponding to the TRP #1 is different from a control resource set-related parameter corresponding to the TRP #2, and a search space-related parameter corresponding to the TRP #1 is the same as a search space-related parameter corresponding to the TRP #2. Alternatively, it is assumed that a control resource set-related parameter corresponding to the TRP #1 is the same as a control resource set-related parameter corresponding to the TRP #2, and a search space-related parameter corresponding to the TRP #1 is different from a search space-related parameter corresponding to the TRP #2. Alternatively, it is assumed that a control resource set-related parameter corresponding to the TRP #1 is different from a control resource set-related parameter corresponding to the TRP #2, and a search space-related parameter corresponding to the TRP #1 is different from a search space-related parameter corresponding to the TRP #2. After receiving DCI, the terminal device may determine, with reference to a third correspondence, a TRP or a link that sends the DCI.

The third correspondence indicates a correspondence between N control resource set-related parameters and N different identifiers (that is, identifiers associated with the N control resource set-related parameters), and/or the third correspondence indicates a correspondence between N search space-related parameters and N different identifiers (that is, identifiers associated with the N search space-related parameters). The third correspondence may be sent by the network device to the terminal device, or may be prestored on the terminal device, or may be agreed upon in a protocol. This is not limited in this embodiment of this application.

Specifically, for another implementation of a relationship used to associate each set of first parameters with a TRP (or a link), refer to the foregoing other possible implementations. Details are not described again.

For any one of the foregoing possible implementations, after determining a TRP or a link from which received DCI comes, the terminal device may further perform corresponding PDSCH, PUSCH, or PUCCH processing. Using the TRP #1 as an example, after determining that the received DCI comes from the TRP #1, the terminal device may indicate, based on the DCI, a PDSCH for receiving downlink data. Alternatively, after determining that the received DCI comes from the TRP #1, the terminal device may send uplink data to a PUSCH corresponding to the TRP #1. Alternatively, after determining that the received DCI comes from the TRP #1, the terminal device may perform uplink power control or the like on an uplink PUSCH or a PUCCH corresponding to the TRP #1.

The TRP #1 and the TRP #2 may correspond to different HARQ entities, or even different MAC entities and RLC entities. If the TRP #1 and the TRP #2 correspond to different HARQ entities, the terminal device transfers downlink data received from a PDSCH to a corresponding HARQ entity for processing. A case in an uplink direction is similar to this. For uplink data sent to a PUSCH corresponding to a TRP, the terminal device needs to obtain the data from a HARQ entity corresponding to the TRP. A case of beam failure detection (BFD) is also similar to this. For example, the terminal device determines, based on quality of a demodulation reference signal (DMRS) received from the TRP #1 (or the time-frequency resource block K1 corresponding to the TRP #1), whether a beam failure occurs in the TRP #1.

Optionally, in the case 1, the configuration parameters may further include other information. For example, the configuration parameters may further include at least one of the following: cell identification information, a cell radio network temporary identifier, a demodulation reference signal, a TRP identifier, beam information, or beam set information. When determining a TRP or a link that sends DCI, the terminal device may determine the TRP or the link based on the first correspondence, the second correspondence, or the third correspondence, or may determine the TRP or the link based on a correspondence between other configuration information and the TRP or the link. This is not limited.

Case 2: The configuration parameters include cell identification information.

The cell identification information may be a PCI, a CGI, a serving cell index, or a cell group identifier, or may be a cell index flag (CIF) or the like. This is not limited in this embodiment of this application. Any manner in which different TRPs may be distinguished by using identifiers falls within the protection scope of this embodiment of this application. The cell identification information may be included in a physical layer message (for example, DCI), a layer 2 message (for example, a MAC CE), or an RRC message (for example, an RRC reconfiguration message). This is not limited. It should be understood that the cell index flag (CIF) is merely a possible example, and may alternatively be replaced with another name. This is not limited. The following provides example descriptions by using the CIF as an example.

N CIFs may be configured for the cell #A, and the N CIFs respectively correspond to the N TRPs or the N links. Each TRP or each link may correspond to a different CIF, and the CIF is used to distinguish between different TRPs. The CIF may be included in DCI, or may be included in another message. This is not limited. The following provides descriptions by using an example in which the CIF is included in DCI.

The configuration information includes the N sets of downlink control channel-related configuration parameters corresponding to the cell #A. In the case 2, the configuration information includes the N CIFs, the N CIFs correspond to the N TRPs or the N links, that is, each CIF corresponds to one TRP or one link, and each CIF is included in DCI sent by a TRP corresponding to the CIF.

In the case 2, for the terminal device, a CIF corresponding to received DCI may be understood as a CIF carried in the DCI, for the network device, a CIF corresponding to DCI may be understood as a CIF carried in the DCI when the DCI is sent.

In the case 2, the terminal device may determine, based on the CIF corresponding to the DCI, a TRP or a link that sends the DCI.

For example, the terminal device may determine, based on the CIF included in the DCI and a fourth correspondence between a CIF and a TRP or a link, the TRP or the link that sends the DCI. The fourth correspondence may be sent by the network device to the terminal device, or may be prestored on the terminal device, or may be specified in a protocol. This is not limited in this embodiment of this application.

For example, transmission by a TRP #1 and a TRP #2 in the cell #A is supported. In the case 2, a PDCCH configuration corresponding to the TRP #1 and a PDCCH configuration corresponding to the TRP #2 may be the same or different, in other words, a PDCCH location corresponding to the TRP #1 and a PDCCH location corresponding to the TRP #2 may be the same or different. For example, after detecting DCI at a PDCCH time-frequency location of the cell #A, the terminal device determines, based on a CIF carried in the DCI, a TRP or a link from which the DCI comes.

In addition, after determining a TRP or a link from which received DCI comes, the terminal device may further perform corresponding PDSCH, PUSCH, or PUCCH processing. A specific processing process is similar to that in the case 1, and details are not described again.

Optionally, in the case 2, the configuration parameters may further include other information. For example, the configuration parameters may further include at least one of the following: a PDCCH configuration, a cell radio network temporary identifier, a demodulation reference signal, a TRP identifier, beam information, or beam set information. When determining a TRP or a link that sends DCI, the terminal device may determine the TRP or the link based on the fourth correspondence, or may determine the TRP or the link based on the first correspondence, the second correspondence, or the third correspondence, or may determine the TRP or the link based on a correspondence between other configuration information and the TRP or the link. This is not limited.

Case 3: The configuration parameters include a cell radio network temporary identifier (C-RNTI).

N different C-RNTIs may be configured for the cell #A as scrambling sequences (SS) (or descrambling sequences (descrambling sequence)), and the N different C-RNTIs respectively correspond to the N TRPs or the N links.

The configuration information includes the N sets of downlink control channel-related configuration parameters corresponding to the cell #A. In the case 3, the configuration information includes the N C-RNTIs, and the N C-RNTIs correspond to the N TRPs or the N links, that is, each C-RNTI corresponds to one TRP or one link. Each TRP or each link may correspond to a different C-RNTI.

It should be understood that the C-RNTI is a possible example of a scrambling sequence (or a descrambling sequence), and any manner in which different TRPs may be distinguished by using scrambling sequences (or descrambling sequences) falls within the protection scope of this embodiment of this application. For example, in the case 3, N different scrambling sequences (or descrambling sequences) of other types or other names may be configured to respectively correspond to the N TRPs or the N links, that is, the configuration information includes the N scrambling sequences (or descrambling sequences), and the scrambling sequence (or the descrambling sequence) includes but is not limited to the C-RNTI. The following uses the C-RNTI as an example for description.

In the case 3, for the terminal device, a C-RNTI corresponding to received DCI may be understood as a descrambling sequence used for obtaining the DCI, for the network device, a C-RNTI corresponding to DCI may be understood as a scrambling sequence used for scrambling the DCI. A scrambling sequence and a descrambling sequence are usually the same, and may be generally referred to as a scrambling sequence.

In the case 3, the terminal device may determine, based on the C-RNTI corresponding to the DCI, a TRP or a link that sends the DCI.

For example, the terminal device may determine, based on the obtained C-RNTI used for the DCI and a fifth correspondence between a C-RNTI and a TRP or a link, the TRP or the link that sends the DCI. The fifth correspondence may be sent by the network device to the terminal device, or may be prestored on the terminal device, or may be specified in a protocol. This is not limited in this embodiment of this application.

For example, transmission by a TRP #1 and a TRP #2 in the cell #A is supported. In the case 3, a PDCCH configuration corresponding to the TRP #1 and a PDCCH configuration corresponding to the TRP #2 may be the same or different, in other words, a PDCCH location corresponding to the TRP #1 and a PDCCH location corresponding to the TRP #2 may be the same or different. For example, the configuration information includes two SSs. For example, the SSs are C-RNTIs, and the two C-RNTIs respectively correspond to the TRP #1 and the TRP #2. The terminal device performs DCI detection by attempting the two different SSs at a PDCCH time-frequency location of the cell #A. After detecting DCI, the terminal device obtains an SS used for the DCI, and determines a TRP or a link from which the DCI comes.

In addition, after determining a TRP or a link from which received DCI comes, the terminal device may further perform corresponding PDSCH, PUSCH, or PUCCH processing. A specific processing process is similar to that in the case 1, and details are not described again.

Optionally, in the case 3, the configuration parameters may further include other information. For example, the configuration parameters may further include at least one of the following: a PDCCH configuration, cell identification information, a demodulation reference signal, a TRP identifier, beam information, or beam set information. When determining a TRP or a link that sends DCI, the terminal device may determine the TRP or the link based on any one of the first correspondence, the second correspondence, the third correspondence, the fourth correspondence, or the fifth correspondence, or may determine the TRP or the link based on a correspondence between other configuration information and the TRP or the link. This is not limited.

Case 4: The configuration parameters include a demodulation reference signal (DMRS).

The DMRS may be carried on a physical shared channel and sent together with a data signal, to be used to demodulate the data signal carried on the physical shared channel. For example, the DMRS is sent together with downlink data on a PDSCH, or is sent together with uplink data on a PUSCH. Alternatively, the DMRS may be carried on a physical control channel and sent together with control signaling, to be used to demodulate the control signaling carried on the physical control channel. For example, the DMRS is sent together with downlink control signaling on a PDCCH, or is sent together with uplink control signaling on a PUCCH.

N different DMRSs may be configured for the cell #A, and the N different DMRSs respectively correspond to the N TRPs or the N links.

The configuration information includes the N sets of downlink control channel-related configuration parameters corresponding to the cell #A. In the case 4, the configuration information includes the N DMRSs, and the N DMRSs correspond to the N TRPs or the N links, that is, each DMRS corresponds to one TRP or one link.

It should be understood that the DMRS is a possible example of a demodulation reference signal, and any manner in which different TRPs may be distinguished by using demodulation reference signals falls within the protection scope of this embodiment of this application. For example, in the case 4, N different demodulation reference signals of other types or other names may be configured to respectively correspond to the N TRPs or the N links. This is not limited. The following uses the DMRS as an example for description.

In the case 4, for the terminal device, a DMRS corresponding to received DCI may be understood as a DMRS received at a time-frequency location of the received DCI, for the network device, a DMRS corresponding to DCI may be understood as a DMRS sent on a corresponding space/time-frequency resource on which the DCI is sent.

In the case 4, the terminal device may determine, based on the DMRS corresponding to the DCI, a TRP or a link that sends the DCI.

For example, the terminal device may determine, based on the received DMRS and a sixth correspondence between a DMRS and a TRP or a link, the TRP or the link that sends the DCI. The sixth correspondence may be sent by the network device to the terminal device, or may be prestored on the terminal device, or may be specified in a protocol. This is not limited in this embodiment of this application.

For example, transmission by a TRP #1 and a TRP #2 in the cell #A is supported. In the case 4, a PDCCH configuration corresponding to the TRP #1 and a PDCCH configuration corresponding to the TRP #2 may be the same or different, in other words, a PDCCH location corresponding to the TRP #1 and a PDCCH location corresponding to the TRP #2 may be the same or different. For example, after detecting DCI at a PDCCH time-frequency location of the cell #A, the terminal device determines, based on DMRS information at a time-frequency location at which the DCI is received (for example, the terminal device may determine whether a DMRS signal is valid depending on whether signal quality corresponding to the DMRS is greater than a preset threshold), a TRP or a link from which the DCI comes.

In addition, after determining a TRP or a link from which received DCI comes, the terminal device may further perform corresponding PDSCH, PUSCH, or PUCCH processing. A specific processing process is similar to that in the case 1, and details are not described again.

Optionally, in the case 4, the configuration parameters may further include other information. For example, the configuration parameters may further include at least one of the following: a PDCCH configuration, cell identification information, a cell radio network temporary identifier, a TRP identifier, beam information, or beam set information. When determining a TRP or a link that sends DCI, the terminal device may determine the TRP or the link based on any one of the first correspondence, the second correspondence, the third correspondence, the fourth correspondence, the fifth correspondence, or the sixth correspondence, or may determine the TRP or the link based on a correspondence between other configuration information and the TRP. This is not limited.

Case 5: The configuration parameters include a TRP identifier.

N identifiers may be configured for the N TRPs in the cell #A. The N identifiers respectively correspond to the N TRPs, and the identifiers are used to identify the TRPs.

The configuration information includes the N sets of downlink control channel-related configuration parameters corresponding to the cell #A. In the case 5, the configuration information includes the N identifiers, and the N identifiers correspond to the N TRPs, that is, each identifier corresponds to one TRP. For example, the identifier may be a TRP ID. This is not limited. The following uses the TRP ID as an example for description.

In the case 5, for the terminal device, an identifier corresponding to received DCI may be understood as a TRP identifier associated with a PDCCH configuration based on which the DCI is received, for the network device, an identifier corresponding to DCI may be understood as a TRP identifier configured by the network device when the network device configures a PDCCH configuration, and the configured TRP identifier is associated with the PDCCH configuration.

In the case 5, the terminal device may determine, based on the TRP identifier corresponding to the DCI, a TRP or a link that sends the DCI.

For example, the terminal device may determine, based on the TRP identifier and a seventh correspondence between a TRP identifier and a TRP or a link, the TRP or the link that sends the DCI. The seventh correspondence may be sent by the network device to the terminal device, or may be prestored on the terminal device, or may be specified in a protocol. This is not limited in this embodiment of this application.

For example, transmission by a TRP #1 and a TRP #2 in the cell #A is supported. In the case 5, a PDCCH configuration corresponding to the TRP #1 and a PDCCH configuration corresponding to the TRP #2 may be the same or different, in other words, a PDCCH location corresponding to the TRP #1 and a PDCCH location corresponding to the TRP #2 may be the same or different. For example, after detecting DCI at a PDCCH time-frequency location of the cell #A, the terminal device determines, based on a TRP identifier associated with a PDCCH configuration based on which the DCI is received, a TRP or a link from which the DCI comes.

In addition, after determining a TRP or a link from which received DCI comes, the terminal device may further perform corresponding PDSCH, PUSCH, or PUCCH processing. A specific processing process is similar to that in the case 1, and details are not described again.

Optionally, in the case 5, the configuration parameters may further include other information. For example, the configuration parameters may further include at least one of the following: a PDCCH configuration, cell identification information, a cell radio network temporary identifier, a demodulation reference signal, beam information, or beam set information. When determining a TRP or a link that sends DCI, the terminal device may determine the TRP or the link based on any one of the first correspondence, the second correspondence, the third correspondence, the fourth correspondence, the fifth correspondence, the sixth correspondence, or the seventh correspondence, or may determine the TRP or the link based on a correspondence between other configuration information and the TRP or the link. This is not limited.

Case 6: The configuration parameters include beam information or beam set information.

In an NR protocol, a beam may be embodied as a spatial filter, which is also referred to as a spatial domain filter or a spatial parameter (spatial parameters). A beam used to send a signal may be referred to as a transmission beam (Tx beam), or may be referred to as a spatial domain transmit filter or a spatial domain transmit parameter. A beam used to receive a signal may be referred to as a reception beam (Rx beam), or may be referred to as a spatial domain receive filter or a spatial domain receive parameter.

N beams (beam) (or N beam sets) may be configured for the cell #A. The N beams respectively correspond to the N TRPs, and the beam may be indicated by a beam identifier (for example, an SSB index or a CSI-RS index). Alternatively, the N beam sets respectively correspond to the N TRPs, and the beam set may be indicated by a beam set identifier (for example, a beam set index). Different beam sets may include a same quantity of beams or different quantities of beams. Different beam sets include different beams. For example, a beam set 1 may include beams 1 to 4, and a beam set 2 may include beams 5 to 8. This is not limited.

The configuration information includes the N sets of downlink control channel-related configuration parameters corresponding to the cell #A. In the case 6, the configuration parameters include beam information or beam set information, the beam information may include a beam identifier, and the beam set information may include a beam identifier and/or a beam set identifier. This is not limited. The configuration information includes the N beams (or the N beam sets), and the N beams (or the N beam sets) correspond to the N TRPs or the N links, that is, each beam (or each beam set) corresponds to one TRP.

In the case 6, for the terminal device, a beam (or a beam set) corresponding to received DCI may be understood as a beam used to receive the DCI (or a beam set to which a beam for receiving the DCI belongs), for the network device, a beam (or a beam set) corresponding to DCI may be understood as a beam for sending the DCI (or a beam set to which a beam for sending the DCI belongs).

In the case 6, the terminal device may determine, based on the beam (or beam set) corresponding to the DCI, a TRP or a link that sends the DCI.

For example, the terminal device may determine, based on the beam for receiving the DCI (or the beam set to which the beam for receiving the DCI belongs) and a eighth correspondence between a beam (or a beam set) and a TRP or a link, the TRP or the link that sends the DCI. The eighth correspondence may be sent by the network device to the terminal device, or may be prestored on the terminal device, or may be specified in a protocol. This is not limited in this embodiment of this application.

For example, transmission by a TRP #1 and a TRP #2 in the cell #A is supported. In the case 6, a PDCCH configuration corresponding to the TRP #1 and a PDCCH configuration corresponding to the TRP #2 may be the same or different, in other words, a PDCCH location corresponding to the TRP #1 and a PDCCH location corresponding to the TRP #2 may be the same or different. For example, after performing PDCCH detection on different beams (or beam sets) in the cell #A and obtaining DCI, the terminal device determines, based on a beam for obtaining the DCI (or a beam set to which a beam for obtaining the DCI belongs), a TRP or a link from which the DCI comes.

In an example, the configuration information includes two beam sets. For example, the two beam sets may be denoted as a beam set 1 and a beam set 2. The beam set 1 includes beams 1 to 4, and the beam set 1 corresponds to the TRP #1. The beam set 2 includes beams 5 to 8, and the beam set 2 corresponds to the TRP #2. If the terminal device receives DCI from the beam 2, the terminal device determines that the received DCI is sent by the TRP #1, or the terminal device determines that the received DCI is sent by a link between the terminal device and the TRP #1.

In another example, the configuration information includes two beams. For example, the two beams may be denoted as a beam 1 and a beam 2. The beam 1 corresponds to the TRP #1, and the beam 2 corresponds to the TRP #2. If the terminal device receives DCI from the beam 1, the terminal device determines that the received DCI is sent by the TRP #1, or the terminal device determines that the received DCI is sent by a link between the terminal device and the TRP #1.

In addition, after determining a TRP or a link from which received DCI comes, the terminal device may further perform corresponding PDSCH, PUSCH, or PUCCH processing. A specific processing process is similar to that in the case 1, and details are not described again.

Optionally, in the case 6, the configuration parameters may further include other information. For example, the configuration parameters may further include at least one of the following: a PDCCH configuration, cell identification information, a cell radio network temporary identifier, a demodulation reference signal, or a TRP identifier. When determining a TRP or a link that sends DCI, the terminal device may determine the TRP or the link based on any one of the first correspondence, the second correspondence, the third correspondence, the fourth correspondence, the fifth correspondence, the sixth correspondence, the seventh correspondence, or the eighth correspondence, or may determine the TRP or the link based on a correspondence between other configuration information and the TRP or the link. This is not limited.

Based on the foregoing six cases, the terminal device may distinguish a TRP or a link, from which received information comes, based on at least one of the following: a PDCCH configuration, cell identification information, a C-RNTI, a DMRS, a TRP identifier, beam information, or beam set information, to further perform corresponding PDSCH, PUSCH, or PUCCH processing, thereby increasing a transmission rate through multi-transmission-reception-point transmission in a cell.

It should be understood that the foregoing describes the six possible cases by using examples, but this embodiment of this application is not limited thereto. For example, the foregoing six cases may be used separately or in combination.

The following describes the foregoing manner 1 and manner 2 in detail.

Manner 1: Single-Cell Configuration Manner

For example, the configuration parameter is a PDCCH configuration. The network device may configure the cell #A as a serving cell including N sets of PDCCH configurations, and each set of PDCCH configurations corresponds to one TRP.

A multi-level information element structure is used for an RRC message, that is, one information element may include one or more lower-level information elements, for example, a cell group configuration (CellGroupConfig)→a special cell configuration/secondary cell configuration (SpCellConfig/SCellConfig)→a serving cell configuration (ServingCellConfig)→a bandwidth part-dedicated parameter (BWP-DownlinkDedicated)→PDCCH-Config. Therefore, N PDCCH-Config information elements may be included in the ServingCellConfig information element or the BWP-DownlinkDedicated information element. The following provides detailed descriptions by using an example in which the cell #A includes two TRPs that are denoted as a TRP #1 and a TRP #2 for differentiation.

In a possible implementation, the BWP-DownlinkDedicated information element includes two PDCCH-Config information elements that are denoted as PDCCH-Config 1 and PDCCH-Config 2 for differentiation. In other words, one set of ServingCellConfig is provided for the cell #A, that is, one set of ServingCellConfig is configured for the terminal device, and the set of ServingCellConfig includes two sets of PDCCH-Config.

Except the PDCCH configurations, other information included in the set of ServingCellConfig may correspond to both the TRP #1 and the TRP #2. For example, cell indexes (for example, ServCellIndex) or uplink configurations (for example, UplinkConfig) corresponding to the TRP #1 and the TRP #2 may be the same or different. This is not limited.

The PDCCH-Config 1 and the PDCCH-Config 2 in the set of ServingCellConfig correspond to the TRP #1 and the TRP #2 respectively, in other words, the TRP #1 and the TRP #2 correspond to different PDCCH-Config. For example, the TRP #1 and the TRP #2 correspond to different DCI search spaces or time-frequency resources.

The PDCCH-Config 1 and the PDCCH-Config 2 configured in the BWP-DownlinkDedicated information element correspond to the TRP #1 and the TRP #2 respectively (for example, the PDCCH-Config 1 corresponds to the TRP #1, and the PDCCH-Config 2 corresponds to the TRP #2, or the PDCCH-Config 2 corresponds to the TRP #1, and the PDCCH-Config 1 corresponds to the TRP #2). The TRP #1 and the TRP #2 may separately perform data transmission with the terminal device based on their respective PDCCH-Config. In addition, that the PDCCH-Config 2 information element is configured in the BWP-DownlinkDedicated information element, or the PDCCH-Config 1 information element and the PDCCH-Config 2 information element are configured in the BWP-DownlinkDedicated information element may also indicate that a transmission scenario of the terminal device in this case is two-transmission-reception-point transmission in a serving cell (the TRP #1 and the TRP #2 are two transmission reception points in the serving cell). Correspondingly, after receiving a serving cell configuration including the PDCCH-Config 2, the terminal device may learn that the network device has configured multi-transmission-reception-point transmission for the serving cell.

In this embodiment of this application, the multi-transmission-reception-point transmission is used to indicate that a plurality of TRPs in a cell communicate with the terminal device. For brevity, details are not described in the following again.

Alternatively, in another possible implementation, the BWP-DownlinkDedicated information element includes one PDCCH-Config information element, but the PDCCH-Config includes N sets of first parameters respectively corresponding to the N TRPs (or the N links) (the first parameters are described above and are not described in detail again). In other words, one set of PDCCH-Config is provided for the cell #A, that is, one set of PDCCH-Config is configured for the terminal device, and the set of PDCCH-Config includes the N sets of first parameters. The first parameters include a first control resource set-related parameter (for example, ControlResourceSet) and a first search space-related parameter (for example, SearchSpace).

The following provides detailed descriptions by using an example in which N=2 and the cell #A includes two TRPs that are denoted as a TRP #1 and a TRP #2 for differentiation.

The BWP-DownlinkDedicated information element includes one PDCCH-Config information element. The PDCCH-Config includes two sets of first parameters respectively corresponding to two TRPs (or two links). The first parameters include first control resource set-related parameters (for example, ControlResourceSet) and first search space-related parameters (for example, SpaceSearch) that are denoted as ControlResourceSet 1, SearchSpace 1, ControlResourceSet 2, and SearchSpace 2 for differentiation.

In the set of PDCCH-Config, the ControlResourceSet 1 and the SearchSpace 1 correspond to the TRP #1, and the ControlResourceSet 2 and the SearchSpace 2 correspond to the TRP #2. In other words, the TRP #1 and the TRP #2 correspond to one set of PDCCH-Config, and the TRP #1 and the TRP #2 correspond to different PDCCH candidate spaces (time-frequency resources). For example, the TRP #1 and the TRP #2 correspond to different DCI search spaces and/or time-frequency resources.

The TRP #1 and the TRP #2 may separately perform data transmission with the terminal device based on their respective PDCCH candidate spaces (time-frequency resources). In addition, that two sets of ControlResourceSet and two sets of SearchSpace are configured in one PDCCH-Config may also indicate that a transmission scenario of the terminal device in this case is two-transmission-reception-point transmission in a serving cell (the TRP #1 and the TRP #2 are two transmission reception points in the serving cell). Correspondingly, after receiving the PDCCH-Config including the two sets of ControlResourceSet and the two sets of SearchSpace, the terminal device may learn that the network device has configured multi-transmission-reception-point transmission for the serving cell.

In still another possible implementation, the ServingCellConfig information element includes two BWP-DownlinkDedicated information elements that are denoted as BWP-DownlinkDedicated 1 and BWP-DownlinkDedicated 2 for differentiation. In other words, one set of ServingCellConfig is provided for the cell #A, that is, one set of ServingCellConfig is configured for the terminal device, and the set of ServingCellConfig includes two sets of BWP-DownlinkDedicated. Each set of BWP-DownlinkDedicated includes one set of PDCCH-Config, and the two sets of PDCCH-Config are denoted as PDCCH-Config 1 and PDCCH-Config 2 for differentiation.

Except the PDCCH configurations, other information included in the set of ServingCellConfig may correspond to both the TRP #1 and the TRP #2. For example, cell indexes (for example, ServCellIndex) corresponding to the TRP #1 and the TRP #2 may be the same or different, and uplink configurations (for example, UplinkConfig) corresponding to the TRP #1 and the TRP #2 may be the same or different. This is not limited.

The BWP-DownlinkDedicated 1 and the BWP-DownlinkDedicated 2 in the ServingCellConfig correspond to the TRP #1 and the TRP #2 respectively, that is, the PDCCH-Config 1 in the BWP-DownlinkDedicated 1 and the PDCCH-Config 2 in the BWP-DownlinkDedicated 2 correspond to the TRP #1 and the TRP #2 respectively. In other words, the TRP #1 and the TRP #2 correspond to different PDCCH-Config. For example, the TRP #1 and the TRP #2 correspond to different DCI search spaces or time-frequency resources.

The BWP-DownlinkDedicated 1 and the BWP-DownlinkDedicated 2 configured in the ServingCellConfig information element correspond to the TRP #1 and the TRP #2 respectively, that is, the PDCCH-Config 1 and the PDCCH-Config 2 correspond to the TRP #1 and the TRP #2 respectively. For example, the BWP-DownlinkDedicated 1 or the PDCCH-Config 1 corresponds to the TRP #1, and the BWP-DownlinkDedicated 2 or the PDCCH-Config 2 corresponds to the TRP #2. For another example, the BWP-DownlinkDedicated 2 or the PDCCH-Config 2 corresponds to the TRP #1, and the BWP-DownlinkDedicated 1 or the PDCCH-Config 1 corresponds to the TRP #2. This is not limited. The TRP #1 and the TRP #2 may separately perform data transmission with the terminal device based on their respective PDCCH-Config. In addition, that the BWP-DownlinkDedicated 2 is configured in the ServingCellConfig information element, or two BWP-DownlinkDedicated information elements (for example, the BWP-DownlinkDedicated 1 and the BWP-DownlinkDedicated 2) are configured in the ServingCellConfig information element may indicate that a transmission scenario of the terminal device in this case is two-transmission-reception-point transmission in a serving cell (the TRP #1 and the TRP #2 are two transmission reception points in the serving cell). Correspondingly, after receiving a serving cell configuration including the BWP-DownlinkDedicated 2, the terminal device may learn that the network device has configured multi-transmission-reception-point transmission for the serving cell.

It should be noted that the foregoing merely provides example descriptions with reference to the RRC message and the multi-level information element structure used for the RRC message, but this application is not limited thereto. Any manner in which the cell #A may be configured as a serving cell including N sets of PDCCH configurations falls within the protection scope of this embodiment of this application. For example, when a multi-level information element structure in another form is used for the RRC message, the cell #A may also be configured as a serving cell including N sets of PDCCH configurations in a manner similar to the foregoing manner.

It should be understood that naming of the foregoing information elements should not constitute any limitation on this application. This application does not exclude a possibility of defining another name in a future protocol to represent a same or similar meaning.

According to the foregoing manner 1, a plurality of PDCCH configurations are configured for a serving cell that supports multi-transmission-reception-point transmission, to configure multi-transmission-reception-point transmission, so that redundant information can be avoided, existing signaling is reused as much as possible, and signaling overheads are also reduced.

Manner 2: Multi-Cell Configuration Manner

The cell #A is configured as N intra-frequency cells, each intra-frequency cell includes a set of downlink control channel-related configuration parameters, and each intra-frequency cell corresponds to one TRP. The following provides descriptions by using an example in which the cell #A is configured as two intra-frequency serving cells, and the two serving cells correspond to a TRP #1 and a TRP #2. For differentiation, the two intra-frequency serving cells are denoted as a cell #A1 and a cell #A2.

A multi-level information element structure is used for an RRC message. Example descriptions are provided still by using the following multi-level information element structure as an example: CellGroupConfig→SpCellConfig/SCellConfig→ServingCellConfig→BWP-DownlinkDedicated→PDCCH-Config.

In a possible implementation, two cell groups (cell group, CG) may be configured for the terminal device, in other words, two sets of CellGroupConfig may be configured. The two sets of CellGroupConfig respectively correspond to configurations of the cell #A1 and the cell #A2, in other words, the two sets of CellGroupConfig respectively correspond to the TRP #1 and the TRP #2. For example, this implementation may be used for the dual-connectivity-like architecture shown in FIG. 4. This implementation is further applicable to any one of the architectures shown in FIG. 4 to FIG. 7. This is not limited.

Each set of CellGroupConfig includes one set of PDCCH-Config (the PDCCH-Config may be included in a lower-level information element of the CellGroupConfig), and the two sets of PDCCH-Config are denoted as PDCCH-Config 1 and PDCCH-Config 2 for differentiation. The PDCCH-Config 1 and the PDCCH-Config 2 correspond to the TRP #1 and the TRP #2 respectively, in other words, the TRP #1 and the TRP #2 correspond to different PDCCH-Config. For example, the TRP #1 and the TRP #2 correspond to different DCI search spaces or time-frequency resources.

The network device sends a configuration message to the terminal device. The configuration message includes two sets of configuration parameters. The two sets of configuration parameters may be two sets of CellGroupConfig, or the two sets of configuration parameters may be two sets of PDCCH-Config.

In another possible implementation, configurations of two serving cells are provided for the cell #A, in other words, two sets of ServingCellConfig are provided for the cell #A. To be specific, one cell group configuration (CellGroupConfig) includes two sets of ServingCellConfig that are denoted as ServingCellConfig 1 and ServingCellConfig 2 for differentiation. The ServingCellConfig 1 and the ServingCellConfig 2 correspond to a configuration of the cell #A1 and a configuration of the cell #A2 respectively, in other words, the ServingCellConfig 1 and the ServingCellConfig 2 correspond to the TRP #1 and the TRP #2 respectively. For example, this implementation may be used for the single-cell-like architectures shown in FIG. 5 and FIG. 7 and the carrier-aggregation-like architecture shown in FIG. 6. This implementation is further applicable to the multi-connectivity-like architecture shown in FIG. 4. This is not limited.

Cell indexes (for example, ServCellIndex) corresponding to the two sets of ServingCellConfig may be the same or different, and uplink configurations (for example, UplinkConfig) corresponding to the two sets of ServingCellConfig may be the same or different, in other words, cell indexes, uplink configurations, or the like corresponding to the TRP #1 and the TRP #2 may be the same or different.

Each set of ServingCellConfig includes one set of PDCCH-Config, and the two sets of PDCCH-Config are denoted as PDCCH-Config 1 and PDCCH-Config 2 for differentiation. The PDCCH-Config 1 and the PDCCH-Config 2 correspond to the TRP #1 and the TRP #2 respectively, in other words, the TRP #1 and the TRP #2 correspond to different PDCCH-Config. For example, the TRP #1 and the TRP #2 correspond to different DCI search spaces or time-frequency resources.

The network device sends a configuration message to the terminal device. The configuration message includes two sets of configuration parameters. The two sets of configuration parameters may be two sets of ServingCellConfig, or the two sets of configuration parameters may be two sets of PDCCH-Config.

In this implementation, the SpCellConfig information element includes two ServingCellConfig information elements that are denoted as ServingCellConfig 1 and ServingCellConfig 2 for differentiation. In other words, one set of SpCellConfig is provided for the cell #A, the set of SpCellConfig includes two sets of ServingCellConfig, and each set of ServingCellConfig includes one set of PDCCH-Config. The TRP #1 and the TRP #2 may separately perform data transmission with the terminal device based on their respective PDCCH-Config.

It should be noted that the foregoing merely provides example descriptions with reference to the RRC message and the multi-level information element structure used for the RRC message, but this application is not limited thereto. Any manner in which the cell #A may be configured as N intra-frequency serving cells falls within the protection scope of this embodiment of this application. For example, when a multi-level information element structure in another form is used for the RRC message, the cell #A may also be configured as N intra-frequency serving cells in a manner similar to the foregoing manner.

It should be understood that naming of the foregoing information elements should not constitute any limitation on this application. This application does not exclude a possibility of defining another name in a future protocol to represent a same or similar meaning.

Based on the foregoing manner 2, according to the method for configuring a serving cell supporting multi-transmission-reception-point transmission as two intra-frequency serving cells, existing DC or CA configuration procedures or signaling can be reused as much as possible, thereby simplifying a protocol design.

Considering that there are a plurality of protocol architectures used for communication between the terminal device and the N TRPs, this embodiment of this application further provides several manners for the terminal device to determine a type of a protocol architecture. In addition, the terminal device may also communicate with a TRP based on the determined type of the protocol architecture. Details are described below.

Optionally, the terminal device obtains indication information. The indication information is used to indicate a type of a protocol architecture used for communication between the terminal device and the N TRPs. For differentiation, the indication information is denoted as indication information #1. The type of the protocol architecture includes at least one of the following: a multi-connectivity-like architecture, a carrier-aggregation-like architecture, or a single-cell-like architecture.

The multi-connectivity-like architecture may be the architecture shown in FIG. 4, the carrier-aggregation-like architecture is the architecture shown in FIG. 6, and the single-cell-like architecture includes the first single-cell-like architecture shown in FIG. 5 and the second single-cell-like architecture shown in FIG. 7. In another implementation, the type of the protocol architecture indicated by the indication information #1 includes at least one of the following: a multi-connectivity-like architecture, a carrier-aggregation-like architecture, a first single-cell-like architecture, or a second single-cell-like architecture.

Specifically, the type of the protocol architecture used for communication with the N TRPs may be one or more types predefined or specified in a protocol, or the type of the protocol architecture used for communication with the N TRPs may be notified by the network device to the terminal device. This is not limited in this embodiment of this application.

In a possible implementation, a protocol predefines or specifies one type of protocol architecture to be used.

For example, the protocol predefines/specifies that the multi-connectivity-like architecture is to be used. For another example, the protocol predefines/specifies that the carrier-aggregation-like architecture is to be used. For another example, the protocol predefines/specifies that the first single-cell-like architecture is to be used. For another example, the protocol predefines/specifies that the second single-cell-like architecture is to be used. In this case, that the terminal device obtains the indication information #1 may be understood as that the terminal device determines, as predefined in a protocol or specified in a protocol, a type of a protocol architecture used for communication with N TRPs in one serving cell.

In another possible implementation, a protocol predefines or specifies a plurality of types of protocol architectures to be used.

For example, the protocol predefines/specifies that at least two of the following protocol architectures are to be used: the multi-connectivity-like architecture, the carrier-aggregation-like architecture, the first single-cell-like architecture, or the second single-cell-like architecture. In this case, that the terminal device obtains the indication information #1 may be understood as that the terminal device determines, as predefined in a protocol or specified in a protocol, a type of a protocol architecture used for communication with N TRPs in one serving cell.

In another possible implementation, the network device sends the indication information #1 to the terminal device. Correspondingly, the terminal device receives the indication information #1, and the terminal device determines the type of the protocol architecture based on the received indication information #1.

The indication information #1 may be explicitly indicated by a dedicated information element, or the indication information #1 may be implicitly indicated by a specific value of an existing information element, in a specific configuration manner (for example, an information element is configured as a plurality of pieces), and/or in another manner. For example, the type of the protocol architecture may be explicitly indicated by a dedicated multiTrpTransType information element in a ServingCellConfig information element. For another example, when an information element is configured as Y pieces (Y is an integer greater than 1 or equal to 1), the terminal device may determine that the type of the protocol architecture is a specific architecture (for example, the multi-connectivity-like architecture, the carrier-aggregation-like architecture, the first single-cell-like architecture, or the second single-cell-like architecture). For another example, when an information element is configured as one piece, the terminal device may determine that the type of the protocol architecture is one type of architecture (for example, the multi-connectivity-like architecture), or when the information element is configured as two pieces, the terminal device may determine that the type of the protocol architecture is another type (for example, the carrier-aggregation-like architecture). That an information element is configured as X pieces (X is an integer greater than 1 or equal to 1) and a corresponding architecture type may be specified in advance. This is not limited. It should be understood that naming of the information element is merely an example for description for ease of understanding, and should not constitute any limitation on this application. The information element may have another name or expression.

For example, the network device sends the indication information #1 to the terminal device, and the indication information #1 is used to indicate that the type of the protocol architecture is the multi-connectivity-like architecture. For example, the multiTrpTransType information element includes information used to indicate the multi-connectivity-like architecture. Alternatively, the indication information #1 is used to indicate that the type of the protocol architecture is the carrier-aggregation-like architecture. For example, the multiTrpTransType information element includes information used to indicate the carrier-aggregation-like architecture. Alternatively, the indication information #1 is used to indicate that the type of the protocol architecture is the first single-cell-like architecture. For example, the multiTrpTransType information element includes information used to indicate the first single-cell-like architecture. Alternatively, the indication information #1 is used to indicate that the type of the protocol architecture is the second single-cell-like architecture. For example, the multiTrpTransType information element includes information used to indicate the second single-cell-like architecture.

For another example, the network device sends the indication information #1 to the terminal device, and the indication information #1 is used to indicate that the type of the protocol architecture is at least two of the following: the multi-connectivity-like architecture, the carrier-aggregation-like architecture, the first single-cell-like architecture, or the second single-cell-like architecture. For example, the multiTrpTransType information element includes information used to indicate at least two of the following protocol architectures: the multi-connectivity-like architecture, the carrier-aggregation-like architecture, the first single-cell-like architecture, or the second single-cell-like architecture. For example, if the multiTrpTransType information element includes information used to indicate the multi-connectivity-like architecture and the second single-cell-like architecture, the terminal device may determine that the type of the protocol architecture is the multi-connectivity-like architecture and the second single-cell-like architecture.

It should be noted that, in this embodiment of this application, determining a type of a protocol architecture may also be referred to as determining a type of multi-transmission-reception-point transmission, or may also be referred to as determining a type of a protocol architecture used for multi-transmission-reception-point transmission. The naming is merely an example for description for ease of understanding, and should not constitute any limitation on this application. In the following descriptions, the expression of determining a type of a protocol architecture is used.

It should be understood that the foregoing several possible implementations are merely examples for description, but this application is not limited thereto. Any manner in which the terminal device can determine the type of the protocol architecture falls within the protection scope of this embodiment of this application.

The foregoing describes several manners in which the terminal device determines the type of the protocol architecture. In this embodiment of this application, the terminal device may also perform corresponding protocol stack configuration based on the determined type of the protocol architecture. Details are described below.

Optionally, the terminal device may perform corresponding protocol stack configuration based on the determined type of the protocol architecture. The following separately provides descriptions with reference to the architectures shown in FIG. 4 to FIG. 7.

In a possible implementation, the terminal device determines that the type of the protocol architecture is the multi-connectivity-like architecture.

When the type of the protocol architecture is the multi-connectivity-like architecture, for a configured radio bearer (RB) that is allowed to use the cell #A, one PDCP entity is generated for all the N TRPs (or the N links), and one RLC entity, one MAC entity, and one HARQ entity are generated for each TRP (or each link). That one PDCP entity is generated for all the N TRPs (or the N links) means that the N TRPs (or the N links) share one PDCP entity. That one RLC entity, one MAC entity, and one HARQ entity are generated for each TRP (or each link) means that the N TRPs (or the N links) correspond to N RLC entities, the N TRPs (or the N links) correspond to N MAC entities, and the N TRPs (or the N links) correspond to N HARQ entities. For details, refer to the architecture shown in FIG. 4.

Optionally, a radio bearer (RB) may be a data radio bearer of a service, or may be a signaling radio bearer of a service. For example, for an emergency service, for example, an ultra-reliable and low latency communication (URLLC) service, the foregoing processing is performed on a data radio bearer/signaling radio bearer of the emergency service. Alternatively, the radio bearer (RB) may be a specified data radio bearer/signaling radio bearer. This is not limited in this embodiment of this application. Details are not described in the following again.

In addition, for an RB, when establishing a logical channel for the RB, the network device may configure cells (or resources of cells) in which the logical channel corresponding to the RB can be used for sending. The configuration mentioned in this embodiment of this application may be performed by using a radio bearer (RB) of the cell #A (that is, a serving cell). To be specific, the network device configures the cell #A as a cell capable of sending an RB (for example, an RB corresponding to the URLLC service). In other words, the RB is an RB that is configured by the network device and that is allowed to use the cell #A.

The PDCP entity corresponds to the N RLC entities for data transmission. The N RLC entities are in a one-to-one correspondence with the N MAC entities for data transmission. The N MAC entities are in a one-to-one correspondence with the N HARQ entities for data transmission. When there are a plurality of serving cells, a MAC entity may correspond to a plurality of HARQ entities, and each HARQ entity corresponds to one serving cell.

In another possible implementation, the terminal device determines that the type of the protocol architecture is the carrier-aggregation-like architecture.

When the type of the protocol architecture is the carrier-aggregation-like architecture, for a configured RB that is allowed to use the cell #A, one PDCP entity, one RLC entity, and one MAC entity are generated for all the N TRPs (or the N links), and one HARQ entity is generated for each TRP (or each link). For details, refer to the architecture shown in FIG. 6.

The PDCP entity corresponds to the RLC entity for data transmission. The RLC entity corresponds to the MAC entity for data transmission. The MAC entity corresponds to N HARQ entities for data transmission.

In another possible implementation, the terminal device determines that the type of the protocol architecture is the first single-cell-like architecture.

When the type of the protocol architecture is the first single-cell-like architecture, for a configured RB that is allowed to use the cell #A, one PDCP entity, one RLC entity, one MAC entity, and one HARQ entity are generated for all the N TRPs (or the N links).

The PDCP entity corresponds to the RLC entity for data transmission. The RLC entity corresponds to the MAC entity for data transmission. The MAC entity corresponds to the HARQ entity for data transmission.

In another possible implementation, the terminal device determines that the type of the protocol architecture is the second single-cell-like architecture.

When the type of the protocol architecture is the second single-cell-like architecture, for a configured RB that is allowed to use the cell #A, one PDCP entity, one RLC entity, one MAC entity, and one HARQ entity are generated for all the N TRPs (or the N links).

The PDCP entity corresponds to the RLC entity for data transmission. The RLC entity corresponds to the MAC entity for data transmission. The MAC entity corresponds to the HARQ entity for data transmission.

The foregoing describes that the terminal device may determine the type of the protocol architecture based on the indication information #1. In this embodiment of this application, the terminal device may also determine, based on the determined type of the protocol architecture, that multi-transmission-reception-point transmission is configured for the cell #A. The following describes in detail several methods, provided in this embodiment of this application, for determining, by the terminal device, whether multi-transmission-reception-point transmission is configured for the cell #A.

Optionally, the terminal device may determine, by using any one of the following methods, whether multi-transmission-reception-point transmission is configured for the cell #A, or determine whether the N sets of configuration parameters are specific to multi-transmission-reception-point transmission.

Method A: The terminal device may determine, based on the indication information #1, that multi-transmission-reception-point transmission is configured for the cell #A.

After obtaining the indication information #1 used to indicate the type of the protocol architecture used for communication with the N TRPs, the terminal device may determine the type of the protocol architecture based on the indication information #1, and may also determine, based on the indication information #1, that multi-transmission-reception-point transmission is configured for the cell #A, or determine that a configuration message or the N sets of configuration parameters is/are specific to multi-transmission-reception-point transmission. The indication information #1 used to indicate the type of the protocol architecture used for communication with the N TRPs is described above, and details are not described again.

Method B: The network device may alternatively send, to the terminal device, indication information used to indicate that multi-transmission-reception-point transmission is configured for the cell #A. For differentiation, the indication information is denoted as indication information #2.

Method C: The terminal device may alternatively determine, based on the configuration information of the cell #A, that multi-transmission-reception-point transmission is configured for the cell #A.

The following describes in detail the method B and the method C with reference to the architectures shown in FIG. 4 to FIG. 7.

The following is specific to the multi-connectivity-like architecture shown in FIG. 4.

Compared with a conventional DC architecture (in conventional DC, two MAC entities or two RLC entities for an RB respectively correspond to two access network devices (for example, correspond to an MN and an SN)), the architecture shown in FIG. 4 may be considered as a variant of the DC architecture. In the architecture, two MAC entities or two RLC entities for an RB respectively correspond to two TRPs or two links in one serving cell. For differentiation, the variant is denoted as intra-cell DC, and the conventional DC architecture is denoted as common DC. It should be understood that the naming should not constitute any limitation on this application. For the multi-connectivity-like architecture, intra-cell DC may be configured by reusing a related procedure of common DC, that is, multi-transmission-reception-point transmission in one serving cell is configured by reusing the related procedure of common DC.

For the multi-connectivity-like architecture, an indication may be provided to the terminal device to indicate that the configuration is specific to intra-cell DC, or indicate that the configuration is specific to multi-transmission-reception-point transmission, so that the terminal device can distinguish that the configuration in this case is specific to intra-cell DC. The indication may be an explicit indication (for example, the method B), or may be an implicit indication (for example, the method C). The following separately provides descriptions.

In a possible implementation, the method B is used to explicitly indicate, to the terminal device, that intra-cell DC is configured, that is, the network device may send the indication information #2 to the terminal device to indicate that intra-cell DC is configured. The indication information #2 may be included in a configuration message sent by the network device to the terminal device, for example, in an RRC setup (RRCSetup) message, an RRC resume (RRCResume) message, an RRC reestablishment (RRCReestablishment) message, or an RRC reconfiguration (RRCReconfiguration) message.

For example, the indication information #2 may be a binary value. For example, "o" indicates that intra-cell DC is not configured, that is, common DC is configured, and "1" indicates that intra-cell DC is configured.

For another example, the indication information #2 may be a Boolean value. For example, "False" indicates that intra-cell DC is not configured, that is, common DC is configured, and "True" indicates that intra-cell DC is configured.

For another example, the indication information #2 is in a form of an information element. In other words, whether intra-cell DC is configured may be indicated depending on whether the configuration message includes a specific information element. For example, if the configuration message includes a specific information element, it indicates that intra-cell DC is configured, or if the configuration message does not include the information element, it indicates that intra-cell DC is not configured, that is, common DC is configured. For example, the information element may be multiTrpTrans. It should be understood that naming of the information element is merely an example for description for ease of understanding, and should not constitute any limitation on this application. The information element may have another name or expression.

In another possible implementation, the method C is used to implicitly indicate, to the terminal device, that intra-cell DC is configured. To be specific, depending on that N sets of configuration parameters, for example, N sets of CellGroupConfig, included in the configuration message sent by the network device to the terminal device correspond to same frequency information, it is determined that the configuration is specific to intra-cell DC, or that the configuration is specific to multi-transmission-reception-point transmission, or that the configuration corresponds to N different TRPs or links in the cell #A.

The frequency information may include at least one of the following: absoluteFrequencySSB, absoluteFrequencyPointA, frequencyBandList, scs-SpecificCarrierList, or the like.

The following is specific to the first single-cell-like architecture shown in FIG. 5.

Compared with a conventional CA architecture (using conventional 2CC CA as an example, in the conventional 2CC CA architecture, two HARQ entities respectively correspond to two CCs/cells), the architecture shown in FIG. 5 may be considered as a variant of the CA architecture. In the architecture, the N TRPs share one HARQ entity. For differentiation, the variant is denoted as intra-cell CA, and the conventional CA architecture is denoted as common CA. It is understood that the naming should not constitute any limitation on this application. For the first single-cell-like architecture, intra-cell CA may be configured by reusing a related procedure of common CA, that is, multi-transmission-reception-point transmission in one serving cell is configured by reusing the related procedure of common CA.

Compared with common CA, a configuration of intra-cell CA includes only one HARQ configuration or two identical HARQ configurations.

As described above, for the first single-cell-like architecture, N sets of configuration parameters, for example, N sets of CellGroupConfig or N sets of ServingCellConfig, include M sets of PUCCH configurations, and M is less than N. For example, using the TRP #1 and the TRP #2 shown in FIG. 5 as an example, the TRP #1 and the TRP #2 correspond to only one set of PUCCH configurations.

For the first single-cell-like architecture, an indication may be provided to the terminal device to indicate that the configuration is specific to intra-cell CA, or indicate that the configuration is specific to intra-cell CA with sharing HARQ entity, or indicate that the configuration is specific to multi-transmission-reception-point transmission, so that the terminal device can distinguish that the configuration in this case is specific to intra-cell CA. The indication may be an explicit indication (for example, the method B), or may be an implicit indication (for example, the method C). The following separately provides descriptions.

In a possible implementation, the method B is used to explicitly indicate, to the terminal device, that intra-cell CA is configured, that is, the network device may send the indication information #2 to the terminal device to indicate that intra-cell CA is configured. The indication information #2 may be included in a configuration message sent by the network device to the terminal device, for example, in an RRCSetup message, an RRCResume message, an RRCReestablishment message, or an RRCReconfiguration message.

For example, the indication information #2 may be a binary value. For example, "o" indicates that intra-cell CA is not configured, that is, common CA is configured, and "1" indicates that intra-cell CA is configured.

For another example, the indication information #2 may be a Boolean value. For example, "False" indicates that intra-cell CA is not configured, that is, common CA is configured, and "True" indicates that intra-cell CA is configured.

For another example, the indication information #2 is in a form of an information element. In other words, whether intra-cell CA is configured may be indicated depending on whether the configuration message includes a specific information element. For example, if the configuration message includes a specific information element, it indicates that intra-cell CA is configured, or if the configuration message does not include the information element, it indicates that intra-cell CA is not configured, that is, common CA is configured. For example, the information element may be multiTrpTrans. It should be understood that naming of the information element is merely an example for description for ease of understanding, and should not constitute any limitation on this application. The information element may have another name or expression.

In another possible implementation, the method C is used to implicitly indicate, to the terminal device, that intra-cell CA is configured. To be specific, depending on that N sets of configuration parameters, for example, N sets of CellGroupConfig or N sets of ServingCellConfig, included in the configuration message sent by the network device to the terminal device correspond to same frequency information, it is determined that the configuration is specific to intra-cell CA, or that the configuration is specific to multi-transmission-reception-point transmission, or that the configuration corresponds to N different TRPs or links in the cell #A.

The frequency information may include at least one of the following: absoluteFrequencySSB, absoluteFrequencyPointA, frequencyBandList, scs-SpecificCarrierList, or the like.

The following is specific to the carrier-aggregation-like architecture shown in FIG. 6.

Compared with a conventional CA architecture (using conventional 2CC CA as an example, in the conventional 2CC CA architecture, two HARQ entities respectively correspond to two CCs/cells), the architecture shown in FIG. 6 may be considered as a variant of the CA architecture. In the architecture, two HARQ entities respectively correspond to two TRPs or links in one serving cell. Therefore, for differentiation, the variant is denoted as intra-cell CA (intra-cell CA), and the conventional CA architecture is denoted as common CA. It should be understood that the naming should not constitute any limitation on this application. For the carrier-aggregation-like architecture, intra-cell CA may be configured by reusing a related procedure of conventional CA, that is, multi-transmission-reception-point transmission in one serving cell is configured by reusing the related procedure of conventional CA.

For the carrier-aggregation-like architecture, an indication may be provided to the terminal device to indicate that the configuration is specific to intra-cell CA, or indicate that the configuration is specific to multi-transmission-reception-point transmission, so that the terminal device can distinguish that the configuration in this case is specific to intra-cell CA. The indication may be an explicit indication (for example, the method B), or may be an implicit indication (for example, the method C). The following separately provides descriptions.

In a possible implementation, the method B is used to explicitly indicate, to the terminal device, that intra-cell CA is configured, that is, the network device may send the indication information #2 to the terminal device to indicate that intra-cell CA is configured. The indication information #2 may be included in a configuration message sent by the network device to the terminal device, for example, in an RRCSetup message, an RRCResume message, an RRCReestablishment message, or an RRCReconfiguration message.

For example, the indication information #2 may be a binary value. For example, "0" indicates that intra-cell CA is not configured, that is, common CA is configured, and "1" indicates that intra-cell CA is configured.

For another example, the indication information #2 may be a Boolean value. For example, "False" indicates that intra-cell CA is not configured, that is, common CA is configured, and "True" indicates that intra-cell CA is configured.

For another example, the indication information #2 is in a form of an information element. In other words, whether intra-cell CA is configured may be indicated depending on whether the configuration message includes a specific information element. For example, if the configuration message includes a specific information element, it indicates that intra-cell CA is configured, or if the configuration message does not include the information element, it indicates that intra-cell CA is not configured, that is, common CA is configured. For example, the information element may be multiTrpTrans. It should be understood that naming of the information element is merely an example for description for ease of understanding, and should not constitute any limitation on this application. The information element may have another name or expression.

In another possible implementation, the method C is used to implicitly indicate, to the terminal device, that intra-cell CA is configured. To be specific, depending on that N sets of configuration parameters, for example, N sets of CellGroupConfig or N sets of ServingCellConfig, included in the configuration message sent by the network device to the terminal device correspond to same frequency information, it is determined that the configuration is specific to intra-cell CA, or that the configuration is specific to multi-transmission-reception-point transmission, or that the configuration corresponds to N different TRPs or links in the cell #A.

The frequency information may include at least one of the following: absoluteFrequencySSB, absoluteFrequencyPointA, frequencyBandList, scs-SpecificCarrierList, or the like.

The following is specific to the second single-cell-like architecture shown in FIG. 7.

Compared with a conventional CA architecture (using conventional 2CC CA as an example, in the conventional 2CC CA architecture, two HARQ entities respectively correspond to two CCs/cells), the architecture shown in FIG. 7 may be considered as a variant of the CA architecture. In the architecture, the N TRPs share one HARQ entity. For differentiation, the variant is denoted as intra-cell CA (intra-cell CA), and the conventional CA architecture is denoted as common CA. It is understood that the naming should not constitute any limitation on this application. For the second single-cell-like architecture, intra-cell CA may be configured by reusing a related procedure of conventional CA, that is, multi-transmission-reception-point transmission in one serving cell is configured by reusing the related procedure of conventional CA. Compared with common CA, a configuration of intra-cell CA includes only one HARQ configuration or two identical HARQ configurations.

As described above, for the second single-cell-like architecture, N sets of configuration parameters, for example, N sets of CellGroupConfig or N sets of ServingCellConfig, include N sets of PUCCH configurations. For example, using the TRP #1 and the TRP #2 shown in FIG. 7 as an example, the TRP #1 and the TRP #2 each correspond to one set of PUCCH configurations.

For the second single-cell-like architecture, an indication may be provided to the terminal device to indicate that the configuration is specific to intra-cell CA, or indicate that the configuration is specific to intra-cell CA with sharing HARQ entity, or indicate that the configuration is specific to multi-transmission-reception-point transmission, so that the terminal device can distinguish that the configuration in this case is specific to intra-cell CA. The indication may be an explicit indication (for example, the method B), or may be an implicit indication (for example, the method C). The following separately provides descriptions.

In a possible implementation, the method B is used to explicitly indicate, to the terminal device, that intra-cell CA is configured, that is, the network device may send the indication information #2 to the terminal device to indicate that intra-cell CA is configured. The indication information #2 may be included in a configuration message sent by the network device to the terminal device, for example, in an RRCSetup message, an RRCResume message, an RRCReestablishment message, or an RRCReconfiguration message.

For example, the indication information #2 may be a binary value. For example, "0" indicates that intra-cell CA is not configured, that is, common CA is configured, and "1" indicates that intra-cell CA is configured.

For another example, the indication information #2 may be a Boolean value. For example, "False" indicates that intra-cell CA is not configured, that is, common CA is configured, and "True" indicates that intra-cell CA is configured.

For another example, the indication information #2 is in a form of an information element. In other words, whether intra-cell CA is configured may be indicated depending on whether the configuration message includes a specific information element. For example, if the configuration message includes a specific information element, it indicates that intra-cell CA is configured, or if the configuration message does not include the information element, it indicates that intra-cell CA is not configured, that is, common CA is configured. For example, the information element may be multiTrpTrans. It should be understood that naming of the information element is merely an example for description for ease of understanding, and should not constitute any limitation on this application. The information element may have another name or expression.

In another possible implementation, the method C is used to implicitly indicate, to the terminal device, that intra-cell CA is configured. To be specific, depending on that N sets of configuration parameters, for example, N sets of CellGroupConfig or N sets of ServingCellConfig, included in the configuration message sent by the network device to the terminal device correspond to same frequency information, it is determined that the configuration is specific to intra-cell CA, or that the configuration is specific to multi-transmission-reception-point transmission, or that the configuration corresponds to N different TRPs or links in the cell #A.

The frequency information may include at least one of the following: absoluteFrequencySSB, absoluteFrequencyPointA, frequencyBandList, scs-SpecificCarrierList, or the like.

With reference to different architectures, the foregoing describes that the terminal device may determine, according to this embodiment of this application, whether multi-transmission-reception-point transmission is configured for the cell #A, or determine whether the N sets of configuration parameters are specific to multi-transmission-reception-point transmission. The terminal device may perform different operations for different TRPs. Details are described below.

Optionally, the N sets of downlink control channel-related configuration parameters correspond to the N links of the cell #A, the N links include the first link and the second link, and the terminal device may perform a beam failure detection and beam failure recovery process based on the first link, or the terminal device may perform a random access process based on the first link, or the terminal device may perform radio link management (RLM) based on the first link, or the terminal device may perform RLM based on each of the first link and the second link, and when a radio link failure (RLF) occurs on the first link, trigger radio resource control (RRC) reestablishment.

The N links of the cell #A may be understood as the N TRPs of the cell #A, or may be understood as N channels through which each of the N TRPs of the cell #A communicates with the terminal device. Correspondingly, the first link and the second link may be represented by the first TRP and the second TRP, or the first link may be represented as a link through which the terminal device communicates with the first TRP, and the second link may be represented as a link through which the terminal device communicates with the second TRP.

The first link may be any one or more of the N links, or may be one or more links specified by the network device, or may be one or more links specified in a protocol, or may be one or more primary links in the N links. The primary link is a channel or a link through which the terminal device communicates with a primary TRP (for the primary link, refer to the descriptions of FIG. 5 to FIG. 7). Correspondingly, the first TRP may be any one of the N TRPs, or may be a TRP specified by the network device, or may be a TRP specified in a protocol, or may be a primary TRP in the N TRPs.

For a method for determining the first link or the first TRP by the terminal device, refer to the descriptions in the case 1 to the case 6, for example, the method for determining, by the terminal device based on the configuration parameter corresponding to the received DCI, which TRP or link in the N TRPs in the cell #A is a TRP that sends the DCI. Details are not described again.

For example, the network device may indicate the first link or the first TRP by using an explicit or implicit method. For example, the network device may send an identifier of the first link or an identifier of the first TRP for indication, or an agreement may be specified in a protocol. For another example, the network device may indicate information about the first link or the first TRP by using a specific information element (or a specific information element structure) included in sent configuration information that includes the N sets of downlink control channel-related configuration parameters corresponding to the cell #A. For details, refer to the descriptions in the case 1 to the case 6. Details are not described again.

The second link may be any one or more of the N links other than the first link. Correspondingly, the second TRP may be any one or more of the N TRPs other than the first TRP.

For a method for determining each link (for example, a $Z^{th}$ link) or each TRP (for example, a $Z^{th}$ TRP) by the terminal device, and a method for indicating each link (for example, the $Z^{th}$ link) or each TRP (for example, the $Z^{th}$ TRP) by the network device, refer to the descriptions in the case 1 to the case 6. Details are not described again. Z may be any value in an interval of 1 to N.

For the cell #A, the terminal device can receive information from the N TRPs or the N links of the cell #A, and the terminal device may perform some operations only on one or some of the TRPs or links.

According to this embodiment of this application, the terminal device may perform some operations only on one TRP or link or on some TRPs or links, to avoid performing these processes on one serving cell for a plurality of times, thereby simplifying implementation of the terminal device and reducing protocol complexity.

In a possible implementation, the terminal device performs a beam failure detection (BFD) and beam failure recovery (BFR) process on a TRP or a link specified by the network device.

In another possible implementation, the terminal device performs a random access process on a TRP or a link specified by the network device.

In another possible implementation, the terminal device may perform radio link management (RLM) on a TRP or a link specified by the network device. Alternatively, the terminal device may perform RLM based on each of the N TRPs or the N links, and trigger radio resource control (RRC) reestablishment when a radio link failure (RLF) occurs on a TRP or a link specified by the network device. After a radio link failure occurs on another TRP, the terminal device sends a radio link failure report to a TRP specified by the network device or sends a radio link failure report to the network device, and the TRP specified by the network device or the network device performs corresponding processing. For example, the TRP specified by the network device or the network device deletes the TRP on which the radio link failure occurs, or reconfigures the TRP on which the radio link failure occurs.

In another possible implementation, the terminal device performs a beam failure detection and beam failure recovery process on a TRP or a link specified in a protocol.

In another possible implementation, the terminal device performs a random access process on a TRP or a link specified in a protocol.

In another possible implementation, the terminal device may perform radio link management on a TRP or a link specified in a protocol. Alternatively, the terminal device may perform radio link management based on each of the N TRPs or the N links, and trigger radio resource control (RRC) reestablishment when a radio link failure occurs on a TRP or a link specified in a protocol. After a radio link failure occurs on another TRP, the terminal device sends a radio link failure report to a TRP specified in a protocol or sends a radio link failure report to a network device to which a TRP specified in a protocol belongs, and the TRP specified in the protocol or the network device to which the TRP specified in the protocol belongs performs corresponding processing. For example, the TRP specified in the protocol or the network device to which the TRP specified in the protocol belongs deletes the TRP on which the radio link failure occurs, or reconfigures the TRP on which the radio link failure occurs.

In another possible implementation, the terminal device performs a beam failure detection and beam failure recovery process on a primary TRP or link.

In another possible implementation, the terminal device performs a random access process on a primary TRP or link.

In another possible implementation, the terminal device may perform radio link management on a primary TRP or link. Alternatively, the terminal device may perform radio link management based on each of the N TRPs or the N links, and trigger radio resource control (RRC) reestablishment when a radio link failure (RLF) occurs on a primary TRP or link. After a radio link failure occurs on another TRP, the terminal device sends a radio link failure report to the primary TRP or sends a radio link failure report to a network device to which the primary TRP belongs, and the primary TRP or the network device to which the primary TRP belongs performs corresponding processing. For example, the primary TRP or the network device to which the primary TRP belongs deletes the TRP on which the radio link failure occurs, or reconfigures the TRP on which the radio link failure occurs.

In another possible implementation, the terminal device may perform beam-level RRM measurement on a TRP specified by the network device. Alternatively, the terminal device may perform beam-level RRM measurement on a TRP specified in a protocol. Alternatively, the terminal device may perform beam-level RRM measurement on each of the N TRPs.

With reference to several possible implementations, the foregoing describes that the terminal device may perform some operations only on one TRP or link or on some TRPs or links. It should be understood that the foregoing several possible implementations and specific operations are merely examples for description, but this application is not limited thereto.

It may be understood that, in the foregoing embodiments of this application, the method implemented by the terminal device may alternatively be implemented by a component (for example, a chip or a circuit) that may be used for the terminal device, and the method implemented by the network device may alternatively be implemented by a component (for example, a chip or a circuit) that may be used for the network device.

According to this embodiment of this application, the network device may configure N sets of configuration parameters for the serving cell. Alternatively, this may be understood as that the network device configures one set of configuration parameters for each transmission reception point in the serving cell. In this case, each transmission reception point in the serving cell may perform data transmission with the terminal device based on a configuration parameter configured for the transmission reception point. In this way, interference that may arise when a plurality of transmission reception points in the serving cell communicate with the terminal device by using one set of configuration parameters can be avoided. In addition, the terminal device can communicate with a corresponding transmission reception point based on an actual communication status and a corresponding configuration parameter, thereby improving communication efficiency.

The foregoing describes in detail the method provided in this embodiment of this application with reference to FIG. 4 to FIG. 9. The following describes in detail a communications apparatus provided in the embodiments of this application with reference to FIG. 10 to FIG. 12.

Figure 10:
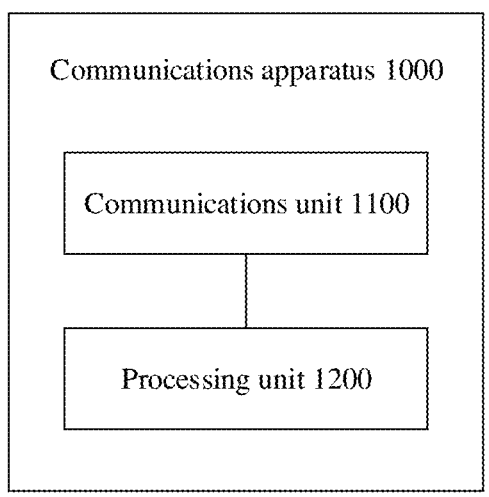
FIG. 10 is a schematic block diagram of an example of a communications apparatus according to this application.

FIG. 10 is a schematic block diagram of a communications apparatus according to an embodiment of this application. As shown in the figure, the communications apparatus 1000 may include a communications unit 1100 and a processing unit 1200.

In a possible design, the communications apparatus 1000 may implement steps or procedures performed by the terminal device corresponding to the foregoing method embodiment. For example, the communications apparatus 1000 may be a terminal device, or a chip or a circuit disposed in a terminal device.

In a possible implementation, the communications unit 1100 is configured to receive configuration information of a serving cell, where the configuration information includes N sets of downlink control channel-related configuration parameters corresponding to the serving cell, each set of configuration parameters includes a same type of parameter, and N is an integer greater than or equal to 2, and the processing unit 1200 is configured to communicate with the serving cell based on the N sets of downlink control channel-related configuration parameters.

Optionally, the communications unit 1100 is further configured to receive first downlink control information (DCI), where a configuration parameter corresponding to the first DCI belongs to one of the N sets of downlink control channel-related configuration parameters, and the processing unit 1200 is configured to determine, based on the first DCI, a link corresponding to the first DCI.

Optionally, the configuration parameters include at least one of the following: a physical downlink control channel (PDCCH) configuration, cell identification information, a cell radio network temporary identifier (C-RNTI), a demodulation reference signal (DMRS), beam set information, or beam information.

Optionally, the N sets of downlink control channel-related configuration parameters correspond to N links of the serving cell, and the N links include a first link and a second link, and the processing unit 1200 is further configured to: perform a beam failure detection and beam failure recovery process based on the first link, or perform a random access process based on the first link, or perform radio link management (RLM) based on the first link, or perform RLM based on each of the first link and the second link, and when a radio link failure (RLF) occurs on the first link, trigger radio resource control (RRC) reestablishment, where the first link is a primary link.

Optionally, the communications unit 1100 is further configured to receive N sets of uplink control channel-related configuration parameters corresponding to the serving cell, where the N sets of uplink control channel-related configuration parameters are in a one-to-one association with the N sets of downlink control channel-related configuration parameters.

Optionally, the processing unit 1200 is further configured to determine a type of a protocol architecture used for communication with the serving cell, where the type of the protocol architecture includes at least one of the following: a multi-connectivity-like architecture, a carrier-aggregation-like architecture, or a single-cell-like architecture.

Optionally, the communications unit 1100 is further configured to obtain indication information, where the indication information is used to indicate the type of the protocol architecture used for communication between the terminal device and the serving cell, and the processing unit 1200 is specifically configured to determine, based on the indication information, the type of the protocol architecture used for communication with the serving cell.

Optionally, the N sets of downlink control channel-related configuration parameters correspond to the N links of the serving cell, and the processing unit 1200 is further configured to: when the type of the protocol architecture is the multi-connectivity-like architecture, corresponding to a configured radio bearer (RB) that is allowed to use the serving cell, generate one packet data convergence protocol (PDCP) entity, generate N radio link control (RLC) entities, generate N media access control (MAC) entities, and generate N hybrid automatic repeat request (HARQ) entities, where the PDCP entity is shared by the N links, the N RLC entities correspond to the N links, the N MAC entities correspond to the N links, and the N HARQ entities correspond to the N links, or when the type of the protocol architecture is the carrier-aggregation-like architecture, corresponding to a configured RB that is allowed to use the serving cell, generate one PDCP entity, one RLC entity, and one MAC entity, and generate N HARQ entities, where the PDCP entity is shared by the N links, the RLC entity is shared by the N links, the MAC entity is shared by the N links, and the N HARQ entities correspond to the N links, or when the type of the protocol architecture is the single-cell-like architecture, corresponding to a configured RB that is allowed to use the serving cell, generate one PDCP entity, one RLC entity, one MAC entity, and one HARQ entity, where the PDCP entity is shared by the N links, the RLC entity is shared by the N links, the MAC entity is shared by the N links, and the HARQ entity is shared by the N links.

In still another possible implementation, the communications unit 1100 is configured to communicate with a serving cell based on N sets of uplink control channel-related configuration parameters corresponding to the serving cell, where the N sets of uplink control channel-related configuration parameters are in a one-to-one association with N sets of downlink control channel-related configuration parameters, the N sets of downlink control channel-related configuration parameters correspond to N links of the serving cell, the N links of the serving cell share one PDCP entity, one RLC entity, one MAC entity, and one HARQ entity, and N is an integer greater than or equal to 2.

Optionally, the configuration parameters include at least one of the following: a physical downlink control channel (PDCCH) configuration, cell identification information, a cell radio network temporary identifier (C-RNTI), a demodulation reference signal (DMRS), beam set information, or beam information.

Specifically, the communications apparatus 1000 may implement steps or procedures performed by the terminal device in the method 200 according to the embodiment of this application. The communications apparatus 1000 may include units configured to perform the method performed by the terminal device in the method 200 in FIG. 9. In addition, the units in the communications apparatus 1000 and the foregoing other operations and/or functions are respectively used to implement corresponding procedures of the method 200 in FIG. 9.

When the communications apparatus 1000 is configured to perform the method 200 in FIG. 9, the communications unit 1100 may be configured to perform step 220 in the method 200, and the processing unit 1200 may be configured to perform step 230 in the method 200.

It should be understood that a specific process in which each unit performs the foregoing corresponding step is described in detail in the foregoing method embodiment. For brevity, details are not described herein.

Figure 11:
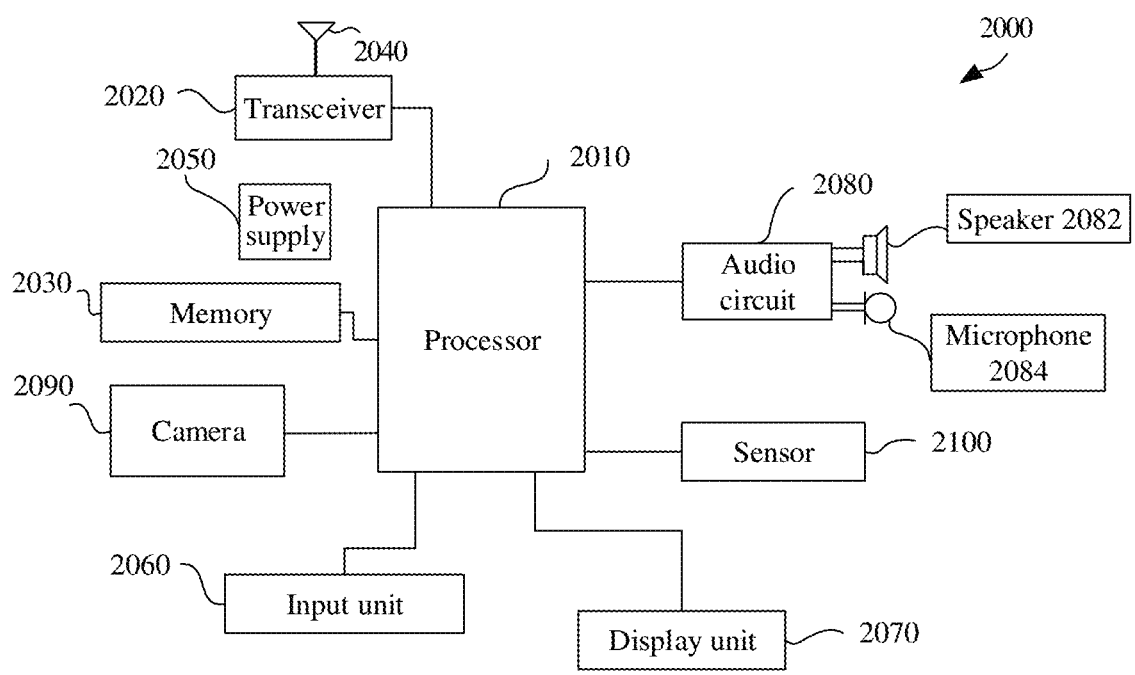
FIG. 11 is a schematic structural diagram of an example of a terminal device according to this application.

It should be further understood that, when the communications apparatus 1000 is a terminal device, the communications unit 1100 in the communications apparatus 1000 may correspond to a transceiver 2020 in a terminal device 2000 shown in FIG. 11, and the processing unit 1200 in the communications apparatus 1000 may correspond to a processor 2010 in the terminal device 2000 shown in FIG. 11.

It should be further understood that when the communications apparatus 1000 is a chip or a circuit disposed in a terminal device, the communications unit 1100 in the communications apparatus 1000 may be an input/output interface.

In another possible design, the communications apparatus 1000 may implement steps or procedures performed by the network device corresponding to the foregoing method embodiment. For example, the communications apparatus 1000 may be a network device, or a chip or a circuit disposed in a network device. For another example, the communications apparatus 1000 may be a transmission reception point, or may be a chip or a circuit disposed in a transmission reception point.

The processing unit 1200 is configured to generate configuration information of a serving cell, where the configuration information includes N sets of downlink control channel-related configuration parameters corresponding to the serving cell, each set of configuration parameters includes a same type of parameter, and N is an integer greater than or equal to 2. The communications unit 1100 is configured to send the configuration information of the serving cell.

Optionally, the communications unit 1100 is further configured to send first downlink control information (DCI), where a configuration parameter corresponding to the first DCI belongs to one of the N sets of downlink control channel-related configuration parameters.

Optionally, the configuration parameters include at least one of the following: a physical downlink control channel (PDCCH) configuration, cell identification information, a cell radio network temporary identifier (C-RNTI), a demodulation reference signal (DMRS), beam set information, or beam information.

Optionally, the communications unit 1100 is further configured to send N sets of uplink control channel-related configuration parameters corresponding to the serving cell, where the N sets of uplink control channel-related configuration parameters are in a one-to-one association with the N sets of downlink control channel-related configuration parameters.

Optionally, the communications unit 1100 is further configured to send indication information, where the indication information is used to indicate a type of a protocol architecture used for communication between a terminal device and the serving cell, and the type of the protocol architecture includes at least one of the following: a multi-connectivity-like architecture, a carrier-aggregation-like architecture, or a single-cell-like architecture.

In still another possible implementation, the communications unit 1100 is configured to communicate with a terminal device based on N sets of downlink control channel-related configuration parameters corresponding to a serving cell, where the N sets of downlink control channel-related configuration parameters correspond to N links of the serving cell, the N links of the serving cell share one PDCP entity, one RLC entity, one MAC entity, and one HARQ entity, the N sets of downlink control channel-related configuration parameters are in a one-to-one association with N sets of uplink control channel-related configuration parameters, and N is an integer greater than or equal to 2.

Optionally, the configuration parameters include at least one of the following: a physical downlink control channel (PDCCH) configuration, cell identification information, a cell radio network temporary identifier (C-RNTI), a demodulation reference signal (DMRS), beam set information, or beam information.

Specifically, the communications apparatus 1000 may implement steps or procedures performed by the network device in the method 200 according to the embodiment of this application. The communications apparatus 1000 may include units configured to perform the method performed by the network device in the method 200 in FIG. 9. In addition, the units in the communications apparatus 1000 and the foregoing other operations and/or functions are respectively used to implement corresponding procedures of the method 200 in FIG. 9.

When the communications apparatus 1000 is configured to perform the method 200 in FIG. 9, the communications unit 1100 may be configured to perform step 220 in the method 200, and the processing unit 1200 may be configured to perform step 210 and step 230 in the method 200.

It should be understood that a specific process in which each unit performs the foregoing corresponding step is described in detail in the foregoing method embodiment. For brevity, details are not described herein.

Figure 12:
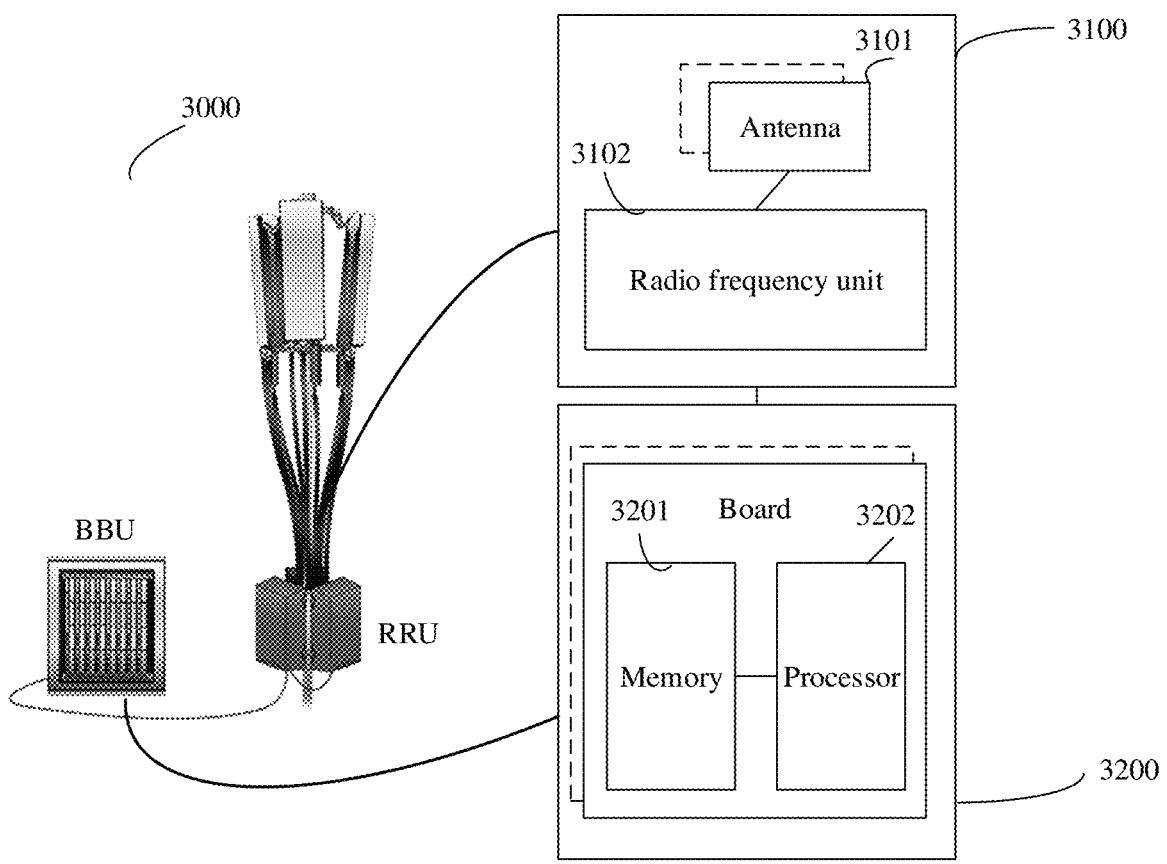
FIG. 12 is a schematic structural diagram of an example of a network device according to this application.

It should be further understood that, when the communications apparatus 1000 is a network device, the communications unit in the communications apparatus 1000 may correspond to a transceiver 3200 in a network device 3000 shown in FIG. 12, and the processing unit 1200 in the communications apparatus 1000 may correspond to a processor 3100 in the network device 3000 shown in FIG. 12.

It should be further understood that when the communications apparatus 1000 is a chip or a circuit disposed in a network device, the communications unit 1100 in the communications apparatus 1000 may be an input/output interface.

FIG. 11 is a schematic structural diagram of a terminal device 2000 according to an embodiment of this application. The terminal device 2000 may be used in the systems shown in FIG. 1 to FIG. 8, to perform functions of the terminal device in the foregoing method embodiment, or implement steps or procedures performed by the terminal device in the foregoing method embodiment.

As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other by using an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may also be integrated into the processor 2010, or may be independent of the processor 2010. The processor 2010 may correspond to the processing unit in FIG. 10.

The transceiver 2020 may correspond to the communications unit in FIG. 10, and may also be referred to as a transceiver unit. The transceiver 2020 may include a receiver (or referred to as a receiver circuit) and a transmitter (or referred to as a transmitter circuit). The receiver is configured to receive a signal, and the transmitter is configured to transmit a signal.

It should be understood that the terminal device 2000 shown in FIG. 11 can implement each process related to the terminal device in the method embodiment in FIG. 9. Operations and/or functions of modules in the terminal device 2000 are intended to implement corresponding procedures in the foregoing method embodiment. For details, refer to the descriptions in the foregoing method embodiment. To avoid repetition, detailed descriptions are properly omitted herein.

The processor 2010 may be configured to perform an action that is implemented inside the terminal device in the foregoing method embodiment, and the transceiver 2020 may be configured to perform an action of receiving or sending that is performed by the terminal device from or to the network device in the foregoing method embodiment. For details, refer to the descriptions in the foregoing method embodiment. Details are not described herein again.

Optionally, the terminal device 2000 may further include a power supply 2050 that is configured to supply power to various devices or circuits in the terminal device.

In addition, to improve functions of the terminal device, the terminal device 2000 may further include one or more of an input unit 2060, a display unit 2070, an audio circuit 2080, a camera 2090, a sensor 2100, and the like, and the audio circuit may further include a speaker 2082, microphone 2084, and the like.

FIG. 12 is a schematic structural diagram of a network device according to an embodiment of this application, for example, may be a schematic structural diagram of a base station. The base station 3000 may be used in the systems shown in FIG. 1 to FIG. 8, to perform functions of the network device in the foregoing method embodiment, or implement steps or procedures performed by the network device in the foregoing method embodiment.

As shown in the figure, the base station 3000 may include one or more radio frequency units, such as a remote radio unit (RRU) 3100 and one or more baseband units (BBU) (which may also be referred to as digital units, digital units, DUs) 3200. The RRU 3100 may be referred to as a transceiver unit, and corresponds to the communications unit 1100 in FIG. 10. Optionally, the transceiver unit 3100 may also be referred to as a transceiver, a transceiver circuit, or the like, and may include at least one antenna 3101 and a radio frequency unit 3102. Optionally, the transceiver unit 3100 may include a receiving unit and a sending unit. The receiving unit may correspond to a receiver (or referred to as a receiver circuit), and the sending unit may correspond to a transmitter (or referred to as a transmitter circuit). The RRU 3100 is mainly configured to: receive and send a radio frequency signal, and perform conversion between a radio frequency signal and a baseband signal. For example, the RRU 3100 is configured to send indication information to the terminal device. The BBU 3200 is mainly configured to: perform baseband processing, control the base station, and so on. The RRU 3100 and the BBU 3200 may be physically disposed together, or may be physically separated, namely, a distributed base station.

The BBU 3200 is a control center of the base station, or may be referred to as a processing unit. The BBU 3200 may correspond to the processing unit 1200 in FIG. 10, and is mainly configured to implement a baseband processing function, for example, channel coding, multiplexing, modulation, or spreading. For example, the BBU (the processing unit) may be configured to control the base station to perform an operation procedure related to the network device in the foregoing method embodiment, for example, generate the foregoing indication information, or configure a serving cell.

In an example, the BBU 3200 may include one or more boards, and a plurality of boards may jointly support a radio access network (for example, an LTE network) having single access standard, or may separately support radio access networks (for example, an LTE network, a 5G network, or another network) having different access standards. The BBU 3200 further includes a memory 3201 and a processor 3202. The memory 3201 is configured to store a necessary instruction and necessary data. The processor 3202 is configured to control the base station to perform a necessary action, for example, is configured to control the base station to perform an operation procedure related to the network device in the foregoing method embodiment. The memory 3201 and the processor 3202 may serve one or more boards. In other words, a memory and a processor may be separately disposed on each board. Alternatively, a plurality of boards may share a same memory and a same processor. In addition, a necessary circuit may be further disposed on each board.

It should be understood that, the base station 3000 shown in FIG. 12 can implement processes related to the network device in the method embodiment in FIG. 9. The operations and/or the functions of the modules in the base station 3000 are intended to implement corresponding procedures in the foregoing method embodiment. For details, refer to the descriptions in the foregoing method embodiment. To avoid repetition, detailed descriptions are properly omitted herein.

The BBU 3200 may be configured to perform an action that is implemented inside the network device in the foregoing method embodiment, and the RRU 3100 may be configured to perform an action of receiving or sending that is performed by the network device from or to the terminal device in the foregoing method embodiment. For details, refer to the descriptions in the foregoing method embodiment. Details are not described herein again.

An embodiment of this application further provides a processing apparatus, including a processor and an interface. The processor may be configured to perform the method in the foregoing method embodiment.

It should be understood that the processing apparatus may be a chip. For example, the processing apparatus may be a field programmable gate array (field programmable gate array, FPGA), an application-specific integrated chip (application specific integrated circuit, ASIC), a system on chip (SoC), a central processing unit (CPU), a network processor (NP), a digital signal processing circuit (digital signal processor, DSP), a micro controller unit (MCU), a programmable controller (programmable logic device, PLD), or another integrated chip.

In an implementation process, steps in the foregoing method can be implemented by using a hardware integrated logic circuit in the processor, or by using instructions in a form of software. The steps in the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor. To avoid repetition, details are not described herein again.

It should be noted that the processor in this embodiment of this application may be an integrated circuit chip and has a signal processing capability. In an implementation process, steps in the foregoing method embodiment can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the method, the steps, and logical block diagrams that are disclosed in the embodiments of this application. The general-purpose processor may be a microprocessor, or the processor may be any conventional processor, or the like. Steps of the method disclosed with reference to the embodiments of this application may be directly implemented and accomplished by using a hardware decoding processor, or may be implemented and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and in the method described in this specification includes but is not limited to these memories and any memory of other proper types.

According to the method provided in the embodiments of this application, this application further provides a computer program product. The computer program product includes computer program code. When the computer program code is run on a computer, the computer is enabled to perform the method according to any one of the embodiments shown in FIG. 9.

According to the method provided in the embodiments of this application, this application further provides a computer-readable medium. The computer-readable medium stores program code. When the program code is run on a computer, the computer is enabled to perform the method according to any one of the embodiments shown in FIG. 9.

According to the method provided in the embodiments of this application, this application further provides a system. The system includes the foregoing one or more terminal devices and one or more network devices.

According to the method provided in the embodiments of this application, this application further provides a system. The system includes the foregoing plurality of transmission reception points TRPs.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD), a semiconductor medium (for example, a solid-state drive SSD)), or the like.

The network device and the terminal device in the foregoing apparatus embodiments completely correspond to the network device and the terminal device in the method embodiment. A corresponding module or unit performs a corresponding step. For example, the communications unit (transceiver) performs a receiving or sending step in the method embodiment, and another step other than the sending step and the receiving step may be performed by the processing unit (processor). For a function of a specific unit, refer to the corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both an application and a computing device that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks (illustrative logical block) and steps (step) described in the embodiments disclosed in this specification may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, division into the units is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device, or the like) to perform all or some of the steps of the method described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    receiving configuration information of a serving cell, wherein the configuration information comprises a set of physical downlink control channel (PDCCH) configurations and N cell identification information, wherein each piece of cell identification of the N cell identification information comprises at least one of a cell global identifier (CGI), a physical cell identifier (PCI), a serving cell index, or a cell group identifier, wherein the set of PDCCH configurations includes N control resource set-related parameters, wherein each control resource set-related parameter of the N control resource set-related parameters and at least a portion of the N cell identification information correspond to a transmission reception point (TRP) of N TRPs, and wherein N is an integer greater than or equal to 2; and
    communicating with the serving cell based on the configuration information, wherein the communicating comprises communicating with the serving cell using a count of a communication parameter generated, and shared by the N TRPs, according to the configuration information, wherein the communication parameter is one of radio link control (RLC) entities, media access control (MAC) entities, or hybrid automatic repeat request (HARQ) entities.

2. The method according to claim 1, wherein each control resource set-related parameter of the N control resource set-related parameters is associated with an identifier.

3. The method according to claim 2, wherein each identifier corresponds to a TRP of the N TRPs.

4. The method according to claim 1, wherein the method further comprises:
    receiving N sets of uplink control channel-related configuration parameters corresponding to the serving cell, wherein each uplink control channel-related configuration parameter of the N sets of uplink control channel-related configuration parameters is in a one-to-one association with a set of downlink control channel-related configuration parameters of the N sets of downlink control channel-related configuration parameters.

5. The method according to claim 1:
    determining a type of a protocol architecture used for communication with the serving cell, wherein the type of the protocol architecture comprises at least one of a multi-connectivity-like architecture, a carrier-aggregation-like architecture, or a single-cell-like architecture.

6. The method according to claim 5, wherein:
    in response to the type of the protocol architecture being the multi-connectivity-like architecture, for a configured radio bearer (RB) that is allowed to use the serving cell, one packet data convergence protocol (PDCP) entity is generated, N radio link control (RLC) entities are generated, N media access control (MAC) entities are generated, and N hybrid automatic repeat request (HARQ) entities are generated, wherein the PDCP entity is shared by the N TRPs, wherein the N RLC entities correspond to the N TRPs, wherein the N MAC entities correspond to the N TRPs, and wherein the N HARQ entities correspond to the N TRPs; or
    in response to the type of the protocol architecture being the carrier-aggregation-like architecture, for a configured RB that is allowed to use the serving cell, one PDCP entity, one RLC entity, and one MAC entity are generated, and N HARQ entities are generated, wherein the PDCP entity is shared by the N TRPs, wherein the RLC entity is shared by N links, wherein the MAC entity is shared by the N TRPs, and wherein the N HARQ entities correspond to the N TRPs; or
    in response to the type of the protocol architecture being the single-cell-like architecture, for a configured RB that is allowed to use the serving cell, one PDCP entity, one RLC entity, one MAC entity, and one HARQ entity are generated, wherein the PDCP entity is shared by the N TRPs, wherein the RLC entity is shared by the N TRPs, wherein the MAC entity is shared by the N TRPs, and wherein the HARQ entity is shared by the N TRPs.

7. The method according to claim 1, further comprising:
    receiving first downlink control information (DCI), wherein a configuration parameter corresponding to the first DCI belongs to one of N downlink control channel-related configuration parameters; and
    determining, based on the first DCI, a TRP corresponding to the first DCI.

8. A communication method, comprising:
    generating configuration information of a serving cell, wherein the configuration information of the serving cell comprises a set of physical downlink control channel (PDCCH) configurations and N cell identification information, wherein each piece of cell identification of the N cell identification information comprises at least one of a cell global identifier (CGI), a physical cell identifier (PCI), a serving cell index, or a cell group identifier, wherein the set of PDCCH configurations includes N control resource set-related parameters, wherein each control resource set-related parameter of the N control resource set-related parameters and at least a portion of the N cell identification information correspond to a transmission reception point (TRP) of N TRPs, and wherein N is an integer greater than or equal to 2; and sending the configuration information of the serving cell, wherein the sending causes a device receiving the configuration information to communicate with the serving cell using a count of a communication parameter generated, and shared by the N TRPs, according to the configuration information, wherein the communication parameter is one of radio link control (RLC) entities, media access control (MAC) entities, or hybrid automatic repeat request (HARQ) entities.

9. The method according to claim 8, wherein each control resource set-related parameter of the N control resource set-related parameters is associated with an identifier.

10. The method according to claim 8, wherein each identifier corresponds to a TRP of the N TRPs.

11. The method according to claim 8, further comprising:

sending indication information, wherein the indication information indicates a type of a protocol architecture used for communication between a terminal device and the serving cell, wherein the type of the protocol architecture comprises at least one of a multi-connectivity-like architecture, a carrier-aggregation-like architecture, or a single-cell-like architecture.

12. A communications apparatus, comprising:

a processor; and a memory coupled with the processor and storing a program for execution by the processor, the program having instructions to:

receive configuration information of a serving cell, wherein the configuration information comprises a set of physical downlink control channel (PDCCH) configurations and N cell identification information, wherein each piece of cell identification of the N cell identification information comprises at least one of a cell global identifier (CGI), a physical cell identifier (PCI), a serving cell index, or a cell group identifier, wherein the set of PDCCH configurations includes N control resource set-related parameters, wherein each control resource set-related parameter of the N control resource set-related parameters and at least a portion of the N cell identification information correspond to a transmission reception point (TRP) of N TRPs, and wherein N is an integer greater than or equal to 2; and communicate with the serving cell based on the configuration information, wherein communicating with the serving cell comprises communicating with the serving cell using a count of a communication parameter generated, and shared by the N TRPs, according to the configuration information, wherein the communication parameter is one of radio link control (RLC) entities, media access control (MAC) entities, or hybrid automatic repeat request (HARQ) entities.

13. The apparatus according to claim 12, wherein each control resource set-related parameter of the N control resource set-related parameters is associated with an identifier.

14. The apparatus according to claim 13, wherein each identifier corresponds to a TRP of the N TRPs.

15. The apparatus according to claim 12, wherein the program further includes instructions to:

receive N sets of uplink control channel-related configuration parameters corresponding to the serving cell, wherein each set of uplink control channel-related configuration parameters of the N sets of uplink control channel-related configuration parameters is in a one-to-one association with a set of downlink control channel-related configuration parameters of N sets of downlink control channel-related configuration parameters.

16. The apparatus according to claim 12, wherein the program further includes instructions to:

determine a type of a protocol architecture used for communication with the serving cell, wherein the type of the protocol architecture comprises at least one of a multi-connectivity-like architecture, a carrier-aggregation-like architecture, or a single-cell-like architecture.

17. The apparatus according to claim 16, wherein:

in response to the type of the protocol architecture being the multi-connectivity-like architecture, for a configured radio bearer (RB) that is allowed to use the serving cell, one packet data convergence protocol (PDCP) entity is generated, N radio link control (RLC) entities are generated, N media access control (MAC) entities are generated, and N hybrid automatic repeat request (HARQ) entities are generated, wherein the PDCP entity is shared by the N TRPs, wherein the N RLC entities correspond to the N TRPs, wherein the N MAC entities correspond to the N TRPs, and wherein the N HARQ entities correspond to the N TRPs; or in response to the type of the protocol architecture being the carrier-aggregation-like architecture, for a configured RB that is allowed to use the serving cell, one PDCP entity, one RLC entity, and one MAC entity are generated, and N HARQ entities are generated, wherein the PDCP entity is shared by the N TRPs, wherein the RLC entity is shared by N links, wherein the MAC entity is shared by the N TRPs, and wherein the N HARQ entities correspond to the N TRPs; or in response to the type of the protocol architecture being the single-cell-like architecture, for a configured RB that is allowed to use the serving cell, one PDCP entity, one RLC entity, one MAC entity, and one HARQ entity are generated, wherein the PDCP entity is shared by the N TRPs, wherein the RLC entity is shared by the N TRPs, wherein the MAC entity is shared by the N TRPs, and wherein the HARQ entity is shared by the N TRPs.

18. The method according to claim 1, wherein the configuration information further comprises N beam set information.

19. The method according to claim 8, wherein the configuration information further comprises N beam set information.

20. The apparatus according to claim 12, wherein the configuration information further comprises N beam set information.

* * * * *